(12) United States Patent
Seno et al.

(10) Patent No.: US 6,918,752 B2
(45) Date of Patent: Jul. 19, 2005

(54) INJECTION MOLDING DEVICE WITH OUTSIDE AIR INLET PART

(75) Inventors: Shinya Seno, Tokyo (JP); Toshiharu Hatakeyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 393 days.

(21) Appl. No.: 10/003,283

(22) Filed: Dec. 6, 2001

(65) Prior Publication Data

US 2002/0071887 A1 Jun. 13, 2002

(30) Foreign Application Priority Data

Dec. 7, 2000 (JP) ........................................ 2000-372870

(51) Int. Cl.⁷ .......................... B29C 33/10; B29C 33/42; B29C 45/26
(52) U.S. Cl. ......................... 425/130; 425/546; 425/555
(58) Field of Search ........................... 264/572; 425/130, 425/547, 552, 555, 546

(56) References Cited

U.S. PATENT DOCUMENTS

| | | | | |
|---|---|---|---|---|
| 5,344,596 A | * | 9/1994 | Hendry | ........................ 425/556 |
| 5,545,365 A | * | 8/1996 | Asai | ........................... 425/556 |
| 5,603,871 A | | 2/1997 | Koseko et al. | |
| 5,730,926 A | * | 3/1998 | Matsumoto et al. | ........ 425/130 |
| 5,868,978 A | * | 2/1999 | Kadoriku et al. | ........... 425/556 |
| 5,972,276 A | * | 10/1999 | Yasuda et al. | ............... 425/130 |
| 6,294,126 B1 | * | 9/2001 | Eckardt et al. | ............. 264/500 |

FOREIGN PATENT DOCUMENTS

WO        94/22652    * 10/1994

* cited by examiner

Primary Examiner—Jill L. Heitbrink
(74) Attorney, Agent, or Firm—Oblon, Spivak, McClelland, Maier & Neustadt, P.C.

(57) ABSTRACT

A resin molding device, resin molding method and resin molded product capable of guiding a sink to an optional position to perform a precise molding. A resin molding metal mold includes a gate formed in the central part of a cavity, a stepped part increasing the opening diameter of the cavity in the circumferential direction orthogonal to the flowing direction of a molten resin introduced into the cavity from the gate, and a fine outside air inlet part circumferentially formed on the outer part from the stepped part. The outside air inlet part is formed of a porous material and allowed to communicate with the outside of the resin molding metal mold through a communicating passage. Accordingly, the molten resin injected into the cavity from the gate is cooled with the outside air introduced from the outside air inlet part formed in the area except a transfer part after the reduction in resin pressure by the stepped part to generate a sink, forming a non-transfer part, so that the transfer property of the transfer part can be improved to enhance the shape precision of the molded product.

17 Claims, 20 Drawing Sheets

3 GATE

3 GATE

3 GATE

3 GATE

3 GATE

3 GATE

INJECTION MOLDING DEVICE WITH OUTSIDE AIR INLET PART

BACKGROUND OF THE INVENTION

1. Field of the Invention

This invention relates to a resin molding device, resin molding method and resin molded product, more speedy, a resin molding device, resin molding method and resin molded product, capable of guiding a sink to an optional place to perform a precise molding.

2. Description of the Prior Art

In an optical writing optical system such as laser type digital copying machine, laser printer, facsimile device or the like, an optical element such as laser beam imaging rectangular lens or mirror having various correcting apparatuses or the like is used.

In recent years, such an optical element is changed in material from glass to plastic due to the demand for lower cost of product and variously diversified in shape as thick wall, thin wall, longitudinally uniform wall and non-uniform wall lenses according to required optical performances.

In resin molding, it is generally difficult to precisely form a molded product having a thick wall part or non-uniform wall part, and a failure phenomenon of transfer precision by sink or contraction distribution is apt to occur in a part requiring functional precision or a part requiring transfer of fine surface shape.

Therefore, it was proposed in the past to press the reverse side or vicinity of a resin part requiring transfer precision to a transfer surface side by the pressure of fluid or gas in molding (refer to Japanese Patent Application Laid-Open No. 10-156861).

However, this method requires a high-pressure fluid source and an expensive and complicated facility such as a control device for controlling the pressure and introducing timing of the fluid from the high-pressure source or the like because the reverse side or vicinity of the resin part requiring transfer precision is pressed to the transfer surface side by the pressure of fluid or gas, and also has the problem of poor availability in the use of a pressure-gas as the fluid, which has many restriction items up to the introduction of the facility including the necessity of permissions for the use of high-pressure gas, the setting position of device and the like.

SUMMARY OF THE INVENTION

A first object of this invention is to provide a durable resin molding device for molding a molded product by injecting a molten resin into the cavity of a metal mold followed by solidification, which comprises an outside air inlet part: formed on the metal mold and opened to an optional part of the cavity to allow the outside of the metal mold to the cavity inside and a stepped part formed within the cavity of the metal mold orthogonally to the flowing direction of the molten resin carried into the cavity, whereby the outside air inlet part can be formed in an optional part except a transfer surface to selectively generate a sink in the resin of the outside air inlet part portion, and the generation of sink in the surface subjected to transfer can be prevented in a low-pressure molding condition without using any special or expensive device to mold a molded product having a highly precise transfer surface at a low cost with low energy consumption.

A second object of this invention is to provide a durable resin molding device for molding a resin molded product by injecting a molten resin into the cavity of a metal mold followed by solidification, which comprises a slit formed on the metal mold to allow an optional part of the cavity to communicate with the outside of the metal mold and a stepped part formed within the cavity of the metal mold orthogonally to the flowing direction of the molten resin introduced into the cavity, whereby the slit can be formed in an optional part except a transfer surface to selectively generate a sink in the resin of the slit part, and the generation of sink in the surface subjected to transfer can be prevented in a low-pressure molding condition without using any special or expensive device to mold a molded product having a precise transfer surface at a lower cost with lower energy consumption.

A third object of this invention is to provide a resin molding device in which the outside air inlet part or slit is formed in the stepped part or the boundary of steps of the stepped part, whereby the stepped part and the outside air inlet part or slit can be formed in an optional part except the transfer surface to selectively generate the sink in the stepped part having the outside air inlet part or slit formed thereon, and the generation of sink in the surface subjected to transfer can be more effectively prevented to mold a molded product having a more precise transfer surface.

A fourth object of this invention is to provide a resin molding device in which the stepped part is formed so as to have a plurality of continuous steps, whereby the sink can be more widely generated in the non-transfer part to more effectively prevent the generation of sink in the surface subjected to transfer, and a molded product having a more precise transfer surface can be molded.

A fifth object of this invention is to provide a resin molding device in which the stepped part is formed so as to have a plurality of continuous steps, and the outside air inlet part or slit is formed in the state communicating with the cavity in the area between the steps, whereby the sink can be more widely generated in the non-transfer part to more effectively prevent the generation of sink in the surface subjected to transfer, and a molded product having a more precise transfer surface can be molded.

A sixth object of this invention to provide a resin molding device in which a gas feeding means for forcedly feeding a prescribed gas to the outside air inlet part or slit is connected to feed the gas into the cavity through the outside air inlet part or slit by the gas feeding means during and after the injection of the molten resin into the cavity, whereby the timing of sink generation can be hastened to more effectively prevent the generation of sink in the surface subjected to transfer in the transfer of the surface of a part slightly distant from the sink position or the like, and the cooling can be rapidly progressed to mold a molded product, even if relatively thin, having a more precise transfer surface.

A seventh object of this invention is to provide a resin molding device in which the gas feeding means for forcedly feeding a prescribed gas to the outside air inlet part or slit is connected to feed the gas into the cavity through the outside air inlet part or slit by the gas feeding means after the injection of the molten resin into the cavity, whereby the resin surface in the periphery of the outside air inlet part or slit can be separated from the metal mold surface while suppressing the entrainment of gas by the resin to guide the sink to an optional position, the timing of sink generation can be hastened to more effectively prevent the generation of sink in the surface subjected to transfer in the transfer of the surface of a part slightly distant from the sink position or the like, and the cooling can be rapidly progressed to mold a molded product, even if relatively thin, having a more precise transfer surface.

An eighth object of this invention is to provide a resin molding method for molding a resin molded product by injecting a molten resin into the cavity of a metal mold followed by solidification, which comprises injecting the molten resin in the state it climbs over a stepped part formed within the cavity of the metal mold orthogonally to the flowing direction of the molten resin introduced into the cavity while introducing the outside air into the cavity through a prescribed outside air inlet part formed on the metal mold and opened to an optional part of the cavity to allow the outside of the metal mold to communicate with the cavity inside, whereby a sink can be selectively generated in the resin of the outside air inlet part formed in an optional part except the transfer surface to prevent the generation of sink in the surface subjected to transfer in a low-pressure molding condition without using any special or expensive device, and a molded product having a precise transfer surface can be molded at a low cost with low energy consumption.

A ninth object of this invention is to provide a resin molding method for molding a resin molded product by injecting a molten resin into the cavity of a metal mold followed by solidification, which comprises injecting the molten resin in the state where it climbs over a stepped part firmed within the cavity of the metal mold orthogonally to the flowing direction of the molten resin introduced into the cavity while introducing the outside air into the cavity through a slit armed on the metal mold to allow an optional part of the cavity to communicate with the outside of the metal mold, whereby a sink can be selectively generated in the resin of the slit part formed in an optional part except the transfer surface to prevent the generation of sink in the surface subjected to transfer in a low-pressure molding condition without using any special or expensive device, and a molded product having a precise transfer surface can be molded by use of the cavity precisely formed without providing any limitation to the metal mold member at a lower cost with lower energy consumption.

A tenth object of this invention is to provide a resin molding method in which the outside air inlet part or slit is formed in the stepped part or the boundary of steps of the stepped part, whereby the stepped part and the outside air inlet part or slit can be formed in an optional part except the transfer surface to selectively generate the sink in the stepped part having the outside air inlet part or slit formed thereon, and the generation of sink in the surface subjected to transfer can be more effectively prevented to mold a molded product having a more precise transfer surface.

An eleventh object of this invention is to provide a resin molding method in which the stepped part is formed so as to have a plurality of continuous steps, whereby the sink can be more widely generated in the non-transfer part to more effectively prevent the generation of sink in the surface subjected to transfer, and a molded product having a more precise transfer surface can be molded.

A twelfth object of this invention is to provide a resin molding method in which the stepped part is formed so as to have a plurality of continuous steps, and the outside air inlet part or slit is formed in the state communicating with the cavity in the area between the steps, whereby the sink can be more widely generated in the non-transfer part to more effectively prevent the generation of sink in the surface subjected to transfer, and a molded product having a more precise transfer surface can be molded.

A thirteenth object of this invention is to provide a resin molding method in which a prescribed gas is id into the cavity through the outside air inlet part or slit by a gas ceding means for forcedly feeding the gas to the outside air inlet part or slit during and after the Section of the molten resin into the cavity, whereby the timing of sink generation can be hastened to more effectively prevent the generation of sink in the surface subjected to transfer in the transfer of the surface of a part slightly distant from the sink position or the like, and the cooling can be rapidly progressed to mold a molded product, even if relatively thin, having a more precise transfer surface.

A fourteenth object of this invention is to provide a resin molding method in which a prescribed gas is fed into the cavity through the outside air inlet part or slit by a gas feeding means for forcedly feeding the gas to the outside air inlet part or slit after the injection of the molten resin into the cavity, whereby the resin surface in the periphery of the outside air inlet part or slit can be separated from the metal mold surface to guide the ink to an optional position while suppressing the entrainment of gas by the resin, the timing of sink generation can be hastened to more effectively prevent the generation of sin in the surface subjected to transfer in the transfer of the surface of a part slightly distant from the sink position or the like, and the cooling can be rapidly progressed to mold a molded product, even if relatively thin, having a more precise transfer surface.

A fifteenth object of this invention is to provide a resin molded product enhanced in the transfer property of the transfer surface near a non-transfer part to provide a precise transfer surface by forming the resin molded product by use of a resin molding device described in any one of the first, second, fourth, sixth and seventh objects or according to a resin molding method deathbed in any one of the eighth, ninth, eleventh, thirteenth, and fourteenth objects, and forming the non-transfer part on the outside air inlet part or slit part.

A sixteenth object of this invention is to provide a resin molded product enhanced in the transfer property of the transfer surface near a non-transfer part to provide a precise transfer surface by arming the resin molded product by use of a resin molding device described in either of the third and fifth objects or according to a resin molding method described in either of the tenth and twelfth objects, and forming the non-transfer part in the stepped part or the boundary of steps of the stepped part.

A seventeenth object of this invention is to provide a resin molded product enhanced in the transfer property of a tooth part that is an irregular-shaped power transmission part to provide a precise gear shape by using a metal mold having a tooth part recessed part for molding the tooth part of a gear formed within the cavity on the molten resin-flowing directional downstream side from the stepped part as the metal mold, firming the resin molded product by use of a resin molding device described in any one of the first object to the seventh object or according to a resin molding method described in any one of the eighth object to the fourteens object, and forming the tooth part.

In order to attain the above objects, a resin molding device fir molding a resin molded product by injecting a molten resin into the cavity followed by solidification according the first object comprises an outside air inlet part formed on the metal mold and opened to an optional part of the cavity of the metal mold to allow the outside of the metal mold to communicate with the cavity inside and a stepped part formed within the cavity of the metal mold orthogonally to the flowing direction of the molten resin injected into the cavity.

In this structure, since the outside air inlet part opened to the optional part of the cavity to allow the outside of the metal mold to communicate with the cavity inside is formed on the metal mold in the molding of the resin molded product by injecting the molten resin into the cavity of the metal mold followed by solidification, and the stepped part is formed within the cavity of the metal mold orthogonally to the flowing direction of the molten resin injected into the cavity, the outside air inlet part can be formed in an optional part except a transfer surface to selectively generate a sink in the resin of the outside air inlet part portion, and the generation of sink in the surface subjected to transfer can be prevented in a low-pressure molding condition without using any special or expensive device to mold a molded product having a precise transfer surface at a low cost with low energy consumption.

A resin molding device for molding a resin molded product by injecting a molten resin into the cavity of a metal mold followed by solidification according to the second object comprises a slit formed on the metal mold to allow an optional part of the cavity to communicate with the outside of the metal mold and a stepped part formed within the cavity of the metal mold orthogonally to the flowing direction of the molten resin introduced into the cavity.

In this structure, since the slit allowing the optional part of the cavity to communicate with the outside of the metal mold is formed on the metal mold, in the molding of the resin molded product by injecting the molten resin into the cavity of the metal mold allowed by solidification, and the stepped part is formed within the cavity of the metal mold orthogonally to the flowing direction of the molten resin injected into the cavity, the slit can be formed in an optional part except the transfer surface to selectively generate a sink in the resin of the slit part, and the generation of sink in the surface subjected to transfer can be prevented in a low-pressure molding condition without using any special or expensive device to mold a molded product having a precise transfer surface at a lower Cost with lower energy consumption by use of the cavity precisely formed without providing any limitation to the metal mold member.

In each case, for example, the outside air inlet part or slit may be formed in the stepped part or the boundary of steps of the stepped part as described in the third object.

In the above structure, since the outside air inlet part or slit is formed in the stepped part or the boundary of steps of the stepped part, the stepped part and the outside inlet part or slit can be formed in an optional part except the transfer surface to selectively generate the sink in the stepped part having the outside air inlet part or slit formed thereon, and the generation of sink in the surface subjected to transfer can be more effectively prevented to mold a molded product having a more precise transfer surface.

The stepped part may be formed, for example, so as to have a plurality of continuous steps as described in the fourth object.

In the above structure, since the stepped part is formed so as have a plurality of continuous steps, the sink can be more widely generated in the non-transfer part to more effectively prevent the generation of sink in the surface subjected to transfer, and a molded product having a more precise transfer surface can be molded.

Further, the stepped part is formed, for example, so as to have a plurality of continuous steps, and the outside air inlet part or slit may be formed in the state communicating with the cavity in the area between the steps as described in the fifth object.

In this structure, since the stepped part is formed so as to have a plurality of continuous steps, and the outside air inlet part or slit is armed in the state communicating with the cavity in the area between the steps, the sink can be more widely generated in the non-transfer part to more effectively prevent the generation of sink in the surface subjected to transfer, and a molded product having a more precise transfer surface can be molded.

The above-mentioned resin molding device may further comprise, for example, a gas feeding means for forcedly feeding a prescribed gas to the outside air inlet part or slit to feed the gas into the cavity through the outside air inlet part or slit by the gas feeding means during and after the injection of the molten resin into the cavity as described in the sixth object.

In this structure, since the gas feeding means for forcedly feeding the prescribed gas to the outside air inlet part or slit is connected to fed the gas into the cavity through the outside air inlet part or slit during and after the injection of the molten resin into the cavity by the gas feeding means, the timing of sink generation can be hastened to more effectively prevent the generation of sink in the surface subjected to transfer in the transfer of the surface of a part slightly distant from the sink position or the like, and the cooling can be rapidly progressed to mold a molded product having a more precise transfer surface.

Further, the above-mentioned resin molding device further may comprise, for example, a gas feeding means for forcedly feeding a prescribed gas to the outside air inlet part or slit to feed the gas into the cavity through the outside air inlet part or slit by the gas feeding means after the injection of the molten resin into the cavity as described in the seventh object.

In this structure, since the gas feeding means for forcedly feeding the prescribed gas to the outside air inlet part or slit is connected to feed the gas into the cavity through the outside air inlet part or slit after the injection of the molten resin into the cavity by the gas feeding means, the resin surface in the periphery of the outside air inlet part or slit can be separated from the metal mold surface while suppressing the entrainment of gas by the resin to guide the sink to an optional position, the timing of sink generation can be hastened to more effectively prevent the generation of sink in the surface subjected to transfer in the transfer of the surface of a part slightly distant from the sink position or the like, and the cooling can be rapidly progressed to mold a mold product, even if relatively thin, having a more precise transfer surface.

A resin molding method for molding a resin molded product by injecting a molten resin into the cavity of a metal mold followed by solidification according to the eighth object comprises injecting the molten resin in the state where it climbs over a stepped part formed within the cavity of the metal mold orthogonally to the flowing direction of the molten resin introduced into the cavity while introducing the outside air into the cavity through a prescribed outside air inlet part formed on the metal mold and opened to an optional part of the cavity to allow the outside of the metal mold to communicate with the cavity inside.

In this structure, since the molten resin is injected in the state where it climbs over the stepped part formed within the cavity of the metal mold orthogonally to the flowing direction of the molten resin injected into the cavity while introducing the outside air into the cavity through the prescribed outside air inlet part formed on the metal mold and opened to an optional part of the cavity to allow the outside of the metal mold to communicate with the cavity inside in the molding of the resin molded product by injecting the molten resin into the cavity of the metal mold followed by solidification, the sink can be selectively generated in the resin of the outside air inlet part portion formed in an optional part except the transfer surface to prevent the generation of sink in the surface subjected to transfer in a low-pressure molding condition without using any special or expensive device, and a molded product having a precise transfer surface can be molded at a low cost with low energy consumption.

A resin molding method for molding a resin molded product by injecting a molten resin into the cavity of a metal mold followed by solidification according to the ninth object comprises injecting the molten resin in the state where it climbs over a stepped part formed within the cavity of the metal mold orthogonally to the flowing direction of the molten resin introduced into the cavity while introducing the outside air into the cavity through a slit formed on the metal mold to allow an optional part of the cavity to communicate with the outside of the metal mold.

In this structure, since the molten resin is injected in the state where it climbs over the stepped part formed within the cavity of the metal mold orthogonally to the flowing direction of the molten resin injected into the cavity while introducing the outside air into the cavity through the slit formed on the metal mold to allow the optional part of the cavity to communicate with the outside of the metal mold, the sink can be selectively generated in the resin of the slit part formed in an optional part except the transfer surface to prevent the generation of sink in the surface subjected to transfer in a low-pressure molding condition without using any special or expensive device, and a molded product having a precise transfer surface can be molded at a lower cost with lower energy consumption by use of the cavity precisely formed without providing any limitation to the metal mold member.

The outside air inlet part or slit in the eighth and ninth objects may be formed, for example, in the stepped part or the boundary of steps of the stepped part as deathbed in the tenth object.

In this structure, since the outside air inlet part or slit is formed in the stepped part or the boundary of steps of the stepped part, the stepped part and the outside air inlet part or slit can be formed in an optional part except the transfer surface to selectively generate the sink in the stepped part having the outside air inlet part or slit formed thereon, and the generation of sink in the surface subjected to transfer can be more effectively prevented to mold a molded product having a more precise transfer surface.

The stepped part may be formed, for example, so as to have a plurality of continuous steps as described in the eleventh object.

In this structure, since the stepped part is formed so as to have a plurality of continuous steps, the sink can be more widely generated in the non-transfer part to more effectively prevent the generation of sink in the surface subjected to transfer, and a molded product having a more precise transfer surface can be molded.

The stepped part may formed, for example, so as to have a plurality of continuous steps, so that the outside air inlet part or slit can be formed in the state communicating with the cavity in the area between the steps as described in the twelfth object.

In this structure, since the stepped part is formed so as to have a plurality of continuous steps, and the outside air inlet part or slit is formed in the state communicating with the cavity in the area between the steps, the sink can be more widely generated in the non-transfer part to more effectively prevent the generation of sink in the surface subjected to transfer, and a molded product having a more precise transfer surface can be molded.

A prescribed gas may be fed into the cavity through the outside air inlet part or slit by a gas feeding means for forcedly feeding the gas to the outside air inlet part or slit during and after the injection of the molten resin into the cavity, for example, as described in the thirteenth object.

In this structure, since the prescribed gas is fed into the cavity through the outside air inlet part or slit during and after the injection of the molten resin into the cavity by the gas feeding means for forcedly feeding the gas to the outside air inlet part or slit, the timing of sink generation can be hastened to more effectively prevent the generation of sink in the surface subjected to transfer in the transfer of the surface of a part slightly distant from the sink position or the like, and the cooling can be rapidly progressed to mold a molded product, even if relatively thin, having a more precise transfer surface.

The prescribed gas may be fed into the cavity through the outside air inlet part or slit by the gas feeding means for forcedly feeding the gas to the outside air inlet part or slit after the injection of the molten resin into the cavity, for example, as described in the fourteenth object.

In this structure, since the prescribed gas is fed into the cavity through the outside air inlet part or slit after the injection of the molten resin into the cavity by the gas feeding means for forcedly feeding the gas to the outside air inlet part or slit, the resin surface in the periphery of the outside air inlet part or slit can be separated from the metal mold surface to guide the sink to an optional position, the timing of sink generation can be hastened to more effectively prevent the generation of sink in the surface subjected to transfer in the transfer of the surface of a part slightly distant from the sink position or the like, and the cooling can be rapidly progressed to mold a molded product, even if relatively thin, having a more precise transfer surface.

A resin molded product according to the fifteenth object is molded by use of a resin molding device described in any one of the first, second, fourth, sixth and seventh objects or according to a resin molding method described in any one of the eighth, ninth, eleventh, thirteenth and fourteenth objects, and comprises a non-transfer part formed in the outside air inlet part or slit part.

In this structure, since the resin molded product is molded by use of the resin molding device described in any one of the first, second, fourth, sixth and seventh objects or according to the resin molding method described in any one of the eighth, ninth, eleventh, thirteenth and fourteenth objects, and the non-transfer part is formed in the outside air inlet part or slit part, the transfer property of the transfer surface near the non-transfer part can be enhanced to provide a precise transfer surface.

A resin molded product according to the sixteenth object is molded by use of a resin molding device described in either of the third and fifth objects or according to a resin molding method described in either of the tenth and twelfth objects, and comprises a non-transfer part formed in the stepped part or the boundary of steps of the stepped part.

In this structure, since the resin molded product is molded by the use of the resin molding device described in either of the third and fifth objects or according to the resin molding method described in either of the tenth and twelfth objects, and the non-transfer part is formed in the stepped part or the boundary of steps of the stepped part, the transfer property of the transfer surface near the non-transfer part can be enhanced to provide a precise transfer surface.

A resin molded product according to the seventeenth object is molded by use of a resin molding device described in any one of the first to seventh objects or according to a resin molding method described in any one of the eighth to fourteenth objects and by using a metal mold having a tooth part recessed part for forming the tooth part of a gear within the cavity on the molten resin-flowing directional downstream side from the stepped part as the metal mold, and comprises the tooth part formed thereon.

In this structure, since the resin molded product is molded by the resin molding device described in any one of the first to seventh objects or according to the resin molding method described in any one of the eighth to fourteenth objects and by use of the metal mold having the tooth part recessed part for forming the tooth part of the gear within the cavity on the molten resin-flowing directional downstream side from the stepped part as the metal mold, and comprises the tooth part formed thereon, the transfer property of the tooth part that is an irregular-shaped power transmission part can be enhanced to provide a precise gear shape.

DESCRIPTION OF THE PREFERRED EMBODIMENT

Preferred embodiments of this invention are further described in detail on the basis of accompanying drawings. Various technically preferable limitations are given to the following embodiments because of the preferred embodiments of this invention. However, the scope of this invention is never limited to these embodiments unless the limitation of this invention is particularly described in the following descriptions.

Figure 1:
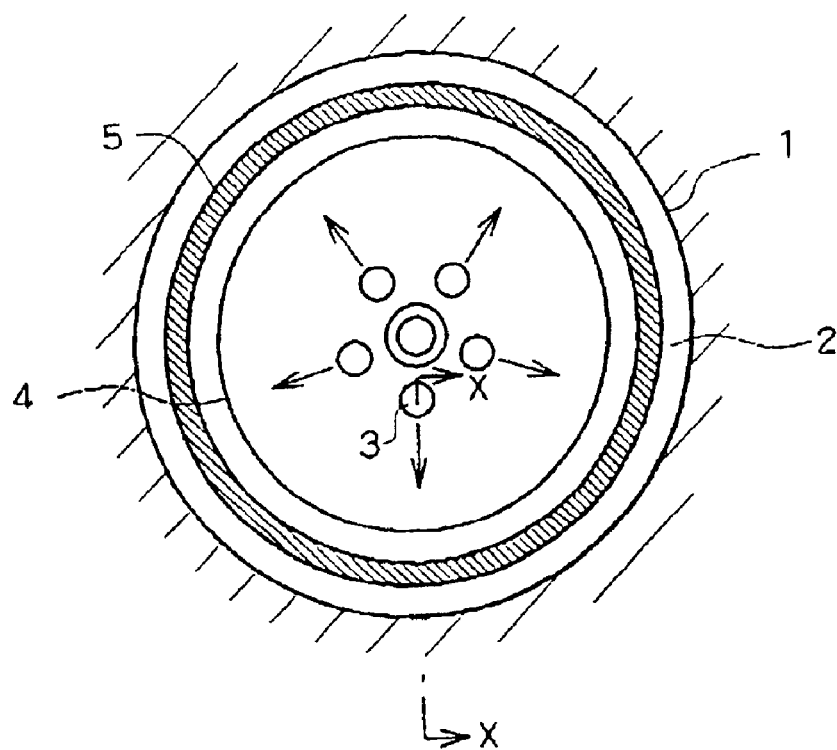
FIG. 1 is a plan sectional view of a rein molding metal mold according to a first embodiment of the resin molding device, resin molding method and resin molded product of this invention, which is taken along the line Y—Y of FIG. 2.

FIGS. 1–8 show a first embodiment of the resin molding device, resin molding method and resin molded product of this invention, and FIG. 1 is a plan sectional view of a resin molding metal mold 1 according to the first embodiment of the resin molding device, resin molding method and resin molded product of this invention.

In FIG. 1, the resin molding metal mold 1 that is a resin molding device has a plurality of gates 3 opened to a cavity 2 in the central part, and the cavity 2 is formed in a hollow disc shape. In the resin molding metal mold 1, a molten resin 10 introduced into the cavity 2 from the gates 3 (refer to FIGS. 2 and 3) spreads and flows radially from the hollow substantially disc-shaped central part as shown by arrows in FIG. 1 to fill the cavity 2.

As the molten resin 10 as the molding material, a resin such as crystalline resin, amorphous resin, elastomer or the like having the contracting property in the solidification of the material can be used, and a resin material containing, for example) inorganic filler, metal powder, magnetic powder or the like is also usable.

Figure 2:
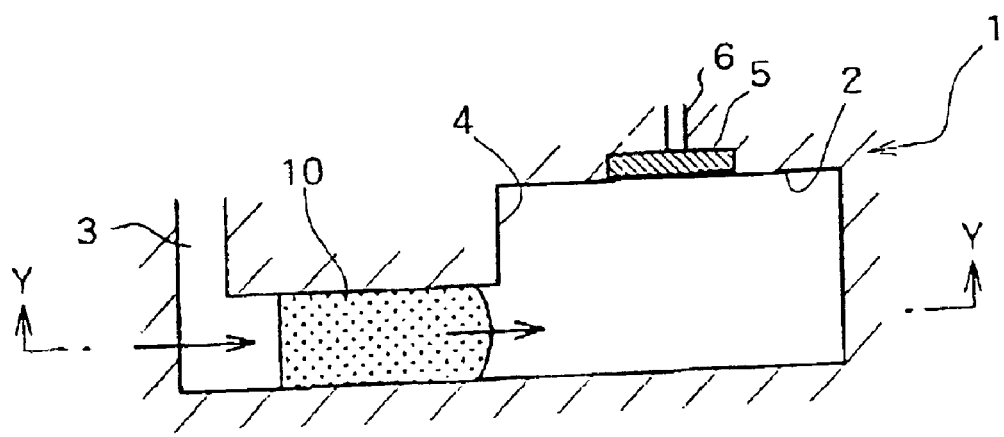
FIG. 2 is an eked front sectional view of the stepped part of the resin molding metal mold of FIG. 1, which is taken along the line X—X of FIG. 1.
Figure 3:
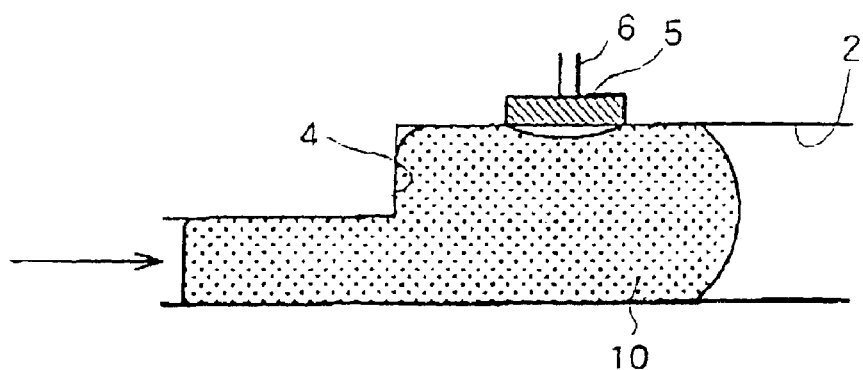
FIG. 3 is an enlarged front sectional view of the stepped part of the resin molding metal mold of FIG. 2 where a molten resin is being injected thereto.
Figure 4:
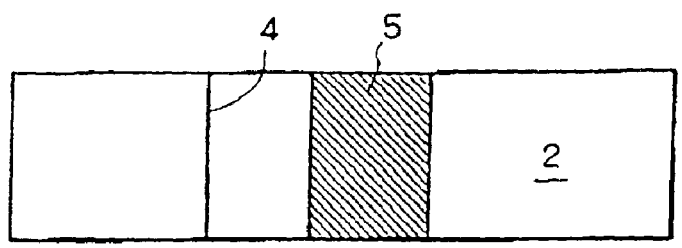
FIG. 4 is an enlarged plan view of the stepped part of the resin molding metal mold of FIG. 2.
Figure 5:
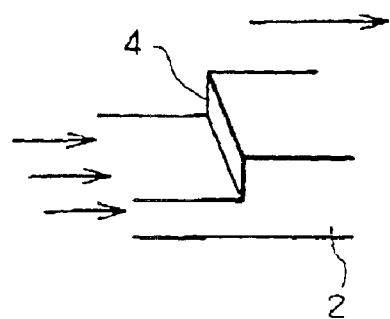
FIG. 5 is a perspective view of the stepped part of the resin molding metal mold of FIG. 2.

A stepped part 4 is circularly formed within the cavity 2, as shown in FIGS. 1–5, orthogonally to the flowing direction of the molten resin 10 introduced into the cavity 2 from the gates 3 or circumferentially, and a fine outside air inlet part 5 is circularly formed on the outer side of the stepped part 4, as shown in FIGS. 1–4, orthogonally to the flowing direction of the molten resin 10 or circumferentially. The outside air inlet part 5 is allowed to communicate with the outside air through a communicating passage 6 opened to the outside of the resin molding metal mold 1 as shown in FIGS. 2 and 3. The outside air inlet part 5 and the communicating passage 6 function as an outside air inlet part as the whole.

Figure 6:
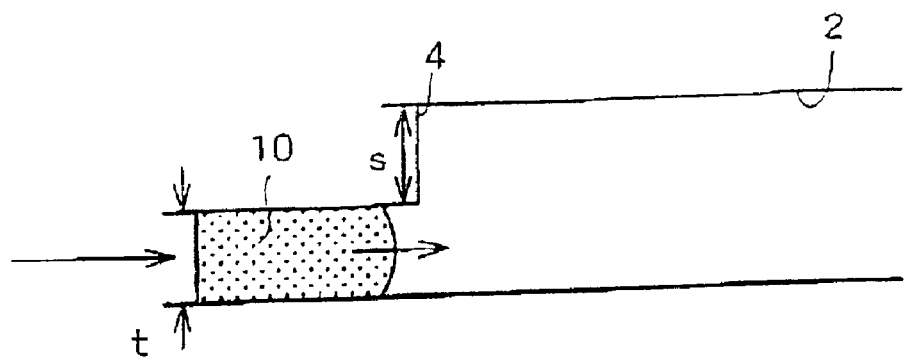
FIG. 6 is an enlarged front sectional view of the stepped part of FIG. 2 dimensionally showing the steps and thickness thereof.
Figure 7:
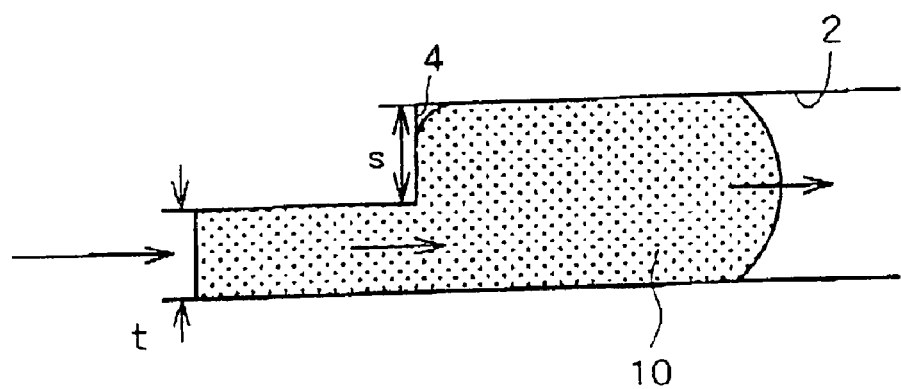
FIG. 7 is an enlarged front sectional view of the stepped part of FIG. 2 dimensionally showing the steps and thickness thereof when the molten resin is being injected to the stepped part.

The cavity 2 is formed so that the opening diameter is larger in the outer side of the stopped part 4 as shown in FIGS. 2 and 3, and the stepped part 4 is formed as large as possible within a range allowable in the whole design of a resin molded product with a step S of 20 μm or more as shown in FIGS. 6 and 7. The step S is desirably set to $s \geq t/10$ to the thickness t of the molded product.

The outside air inlet part 5 is formed of a porous member, at least one fine slit (clearance), or a movable member, and formed in the direction where the molten resin 10 crosses over the outside air inlet part 5 during flowing in the cavity 2, or in the circumferential direction where the molten resin 10 flowing radially from the central part of the cavity 2 crosses over it.

The effect of this embodiment is described. In the resin molding metal mold 1, the molten resin 10, when injected from the gates 3 formed in the central part of the cavity 2, flows radially from the central part of the cavity 2 as shown by the arrows in FIG. 1, and successively passes the circumferentially formed stepped part 4 and outside air inlet part 5 to fill the outermost part of the cavity 2.

The cavity 2 is formed so that the opening diameter is increased with the stepped part 4 as the boundary as shown in FIGS. 2, 3, 6 and 7 to change the molded product shape from a thin part to a thick part. When the molten resin 10 flows from the thin part to the thick part, its pressure is released due to the presence of the stepped part 4 within the cavity 2 to weaken the force of pressing the molten resin 10 to the wall surface of the resin molding metal mold 1. Accordingly, a non-transfer part is apt to be formed in the edge part of the stepped part 4 because the molten resin 10 is not sufficiently intruded thereto. This non-transfer part is apt to start to induce a sink in cooling process because its adhesive force to the resin molding metal mold 1 is smaller than that of the other part. It is particularly effective to set the step S of the stepped part 4 to $s \geq t/10$ to the thickness t of the molded product.

Figure 8:
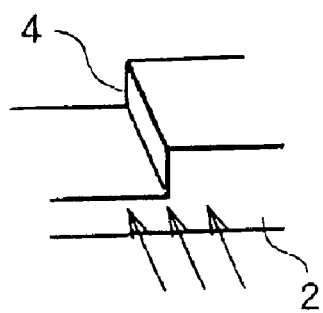
FIG. 8 is a perspective view of the stopped part of the resin molding metal mold of FIG. 5 when the resin is injected in parallel thereto.

It is important to form the stepped part 4 orthogonally to the flowing direction of the molten resin 10 as shown in FIGS. 1–7. When it is formed in the direction parallel to the flowing direction (the arrowed direction in FIG. 8) of the molten resin as shown in FIG. 8, the molten resin 10 gets into the edge part of the stepped part 4, and the above effect cannot be provided.

Since the surface layer of the molten resin 10 is closely fitted to the resin molding metal mold 1 in the flowing process, the heat of the molten resin 10 is instantaneously drained by the resin molding metal mold 1 to solidify it. This phenomenon is particularly remarkable when a resin passage or the cavity 2 has a thin or narrow shape, and this flowing manner of the molten resin 10 is called a fountain flow. When the cavity 2 has a thick shape, to the contrary, the molten resin 10 flows not necessarily closely fitting to the resin molding metal mold 1, and this flowing manner is different from the fountain flow as jetting phenomenon.

In the resin molding metal mold 1 of this embodiment, the fine outside air inlet part 5 allowed to communicate with the outside through the communicating passage 6 is formed in the thick part orthogonally to the flowing direction of the molten resin 10, and the flowing molten resin 10 generates a sink to the thick part by the outside air introduced from the outside air inlet part 5.

When the filling of the cavity 2 with the molten resin 10 is completed, the gates 3 are sealed to perform a pressure retaining process. In the pressure retaining process, also, the part facing the outside air inlet part 5 of the resin 10 is in contact with the outside air to progress the sink. Namely, even in the pressure retaining process up to the sealing of the gates 3 by the cooling and solidification of the resin in the gate part after the completion of the filling with the molten resin 10, the part facing the outside air inlet part 5 of the resin 10 is in contact with the outside air to keep the state more easily generable of sink than the other part.

The cooling process is performed after the completion of the pressure retaining process. In this cooling process, the resin 10 is generally contracted in volume. The resin 10 of the surface part continuously keeps the close fitting with the resin molding metal mold 1 while the pressure of the resin 10 in the resin molding metal mold 1 is not zero. However, when the resin pressure in the resin molding metal mold 1 lowers according to cooling and gets close to zero, the central part of the thick part is cooled, solidified and contracted last. Accordingly, the resin 10 around the central part of the thick part is pulled toward the central part of the thick part. Since the surface layer part of the resin 10 having the weakest close fitting force to the resin molding metal mold 1 is easily released from the resin molding metal mold 1, the resin 10 starts to move toward the central part of the thick part, consequently forming a recessed non-transfer part called sink.

In the resin molding metal mold 1 of this embodiment, however, since the outside air inlet part 5 is formed in the thick part and in contact with the outside air, only the part facing the outside air inlet part 5 is laid in the state where the close fitting force to the resin molding metal mold 1 is released, and the part facing the outside air inlet part 5, where the close fitting force to the resin molding metal mold 1 is weak, is easily pulled toward the thick central part and moved.

Accordingly, the sink can be selectively generated in the resin 10 part facing the outside air inlet part 5 or a molded product part to form the non-transfer part.

When the sink is once generated, this part is relatively higher in temperature than the part making contact with the resin molding metal mold 1 because the cooling from the resin molding metal mold 1 is arrested, and more easily moved because of the low viscosity of the resin 10 to progress the sink.

This sink is progressed, whereby the part subjected to transfer can be less pulled to the thick part by this portion to prevent the sink or contracting deformation of the transfer part.

The outside air inlet part 5 is formed on the resin molding metal mold 1 of the position forming the non-transfer part of the molded product, whereby the non-transfer part can be formed in the part facing the outside air inlet part 5 to improve the transfer property of the transfer part, so that the shape precision of the molded product can be improved, and transfer of surface state such as wrinkle, transfer of fine surface shape or the like can be easily and precisely performed.

It is more effective to enlarge the sink in the non-transfer part of the part facing the outside air inlet part 5. However, when the pressure of the molten resin 10 is too high in the injection filling process of filling the molten resin 10 and the pressure retaining process, the molten resin 10 is cooled and solidified before the internal pressure of the molten resin 10 becomes zero, so that the sink is hardly generated, and the generation effect of sink in the non-transfer part of the part facing the outside air inlet part 5 can not be properly provided. Accordingly, it is important to perform a low-pressure molding in the injection filling process and the pressure retaining process.

When the low-pressure molding is performed, the residual stress to the molded product can be reduced, and a molded product excellent in aging stability can be molded.

Figure 9:
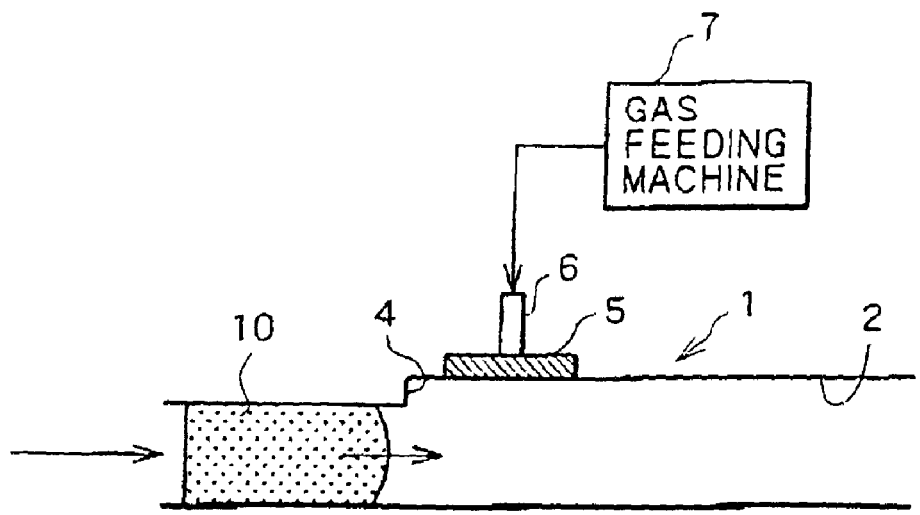
FIG. 9 is a partially enlarged front sectional view of the resin molding metal mold of FIG. 1 in the state where a gas-ceding machine is connected to the outside air inlet part.

In this embodiment, a gas feeding machine (gas feeding means) 7 such as pump may be connected to the communicating passage 6, as shown in FIG. 9, to introduce a prescribed gas such as air to the cavity 2 through the communicating passage 6 and the outside air inlet part 5. The gas introduced by the gas feeding machine 7 may have a low pressure of about 1–6 kgf/cm2.

The gas feeding machine 7 may be driven during and after the filling of the molten resin 10 into the cavity 2 to introduce the gas into the cavity 2 through the communicating passage 6 and the outside air inlet part 5, or driven only after the filling of the molten resin 10 into the cavity 2 to introduce the gas into the cavity 2 through the communicating passage 6 and the outside air inlet part 5.

Accordingly to this, the resin 10 of the part facing the outside air inlet part 5 can be more efficiently cooled to hasten the timing of sink generation, and the sink of the resin 10 of this part can be enlarged more to improve the transfer property of the transfer surface further more. When the gas feeding machine 7 is driven during the filling to introduce the gas into the cavity 2, particularly, the resin 10 of the part facing the outside air inlet part 5 can be made hardly fitted to the metal mold sue of the resin molding metal mold 1. Accordingly, even in the cooling process, the resin of this part is easily released from the metal mold surface to facilitate the formation of the sink. The transfer property of the transfer surface can be improved further more by enlarging the sink of this part more.

Figure 10:
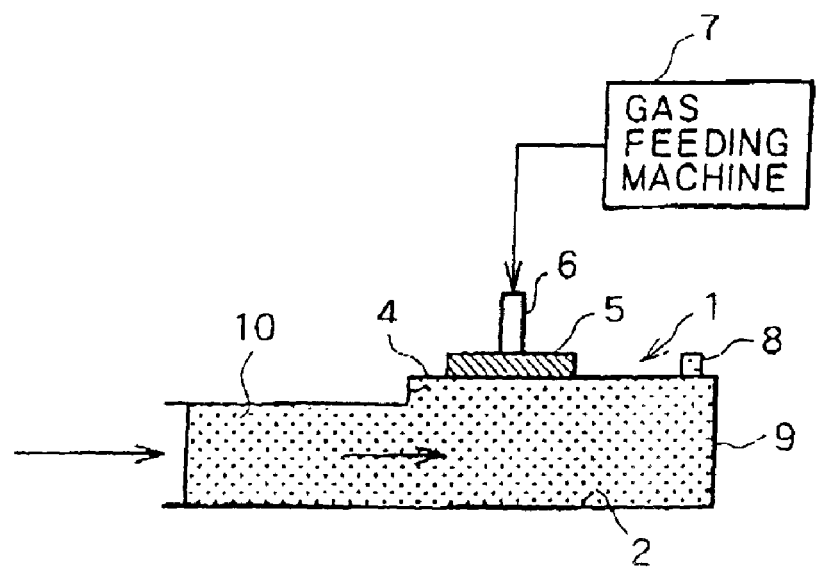
FIG. 10 is a partially enlarged front sectional view of the resin molding metal mold of FIG. 9 in the state filled with the resin.

In this embodiment, a recessed part 8 for forming a protruding projection or rib on the molded product may be further formed on the cavity 2 surface of the resin molding metal mold 1 between the outside air inlet part 5 and a transfer surface 9 as shown in FIG. 10. The gas feeding machine 7 is connected to the communicating passage 6 communicating with the outside air inlet part 5, and the gas feeding machine 7 is driven after and during the filling of the molten resin 10 into the cavity 2 or after the filling to introduce the gas into the cavity 2 through the communicating passage 6 and the outside air inlet part 5.

Accordingly to this, even if the transfer surface 9 is located in a position close to the sink generating position of the resin 10 facing the outside air inlet part 5, the generated surface sink area cannot spread over the rib since the resin in the protruding rib part of the molded product is rapidly cooled and solidified. Accordingly, the surface sink generated relatively near the transfer surface 9 can be prevented from extending to the transfer surface and deteriorating the precision of the transfer surface 9 to improve the transfer property of the transfer surface 9 further more.

In FIG. 10, the same gas feeding machine 7 as in FIG. 9 is connected to the communicating passage 6 communicating with the outside air inlet part 5, but the same effect can be obtained without the gas feeding machine 7. When the gas feeding machine 7 is provided, the resin 10 of the part facing the outside air inlet part 5 can be more efficiently cooled to hasten the timing of sink generation, and the sink of the resin 10 of this part can be more enlarged to improve the transfer property of the transfer surface 9 further more. When the air feeding machine 7 is driven after the filling of the resin, particularly, the resin 10 starts to sink at the timing that the resin pressure is lower than the gas introducing pressure before the internal pressure of the resin 10 of the part facing the outside air inlet part 5 is zero. Accordingly, the sink of the resin 10 of this part can be enlarged more to improve the transfer property of the transfer surface 9 further more.

Figure 11:
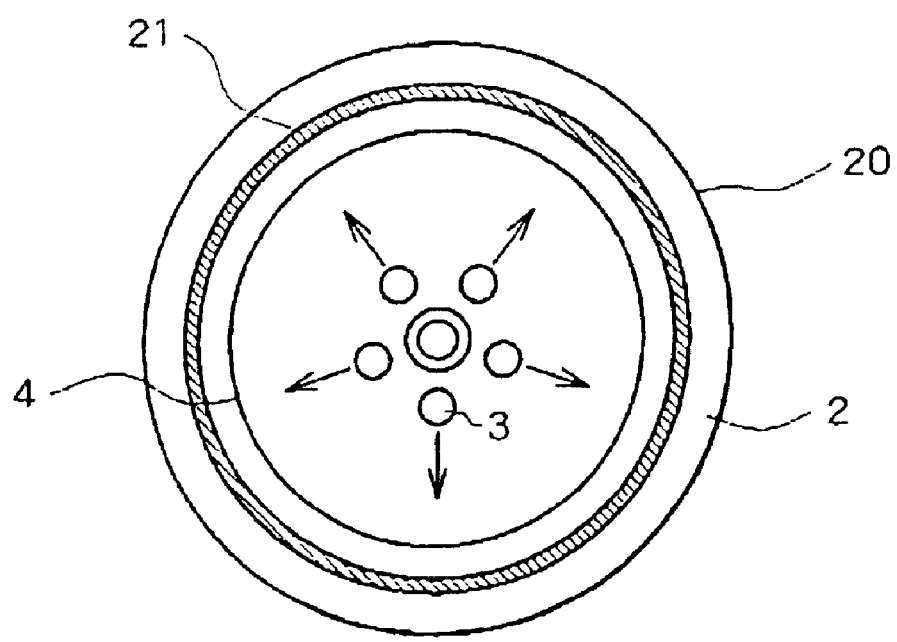
FIG. 11 is a plan sectional view of a resin molding metal mold according to a second embodiment of the resin molding device, resin molding method and resin molded product of this invention.
Figure 12:
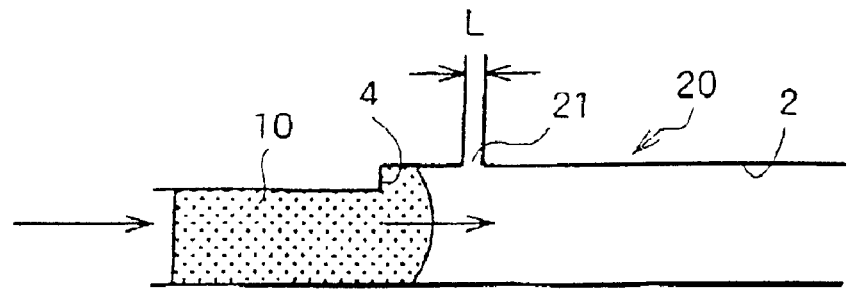
FIG. 12 is an enlarged front sectional view of the stepped part of the resin molding metal mold of FIG. 11.
Figure 13:
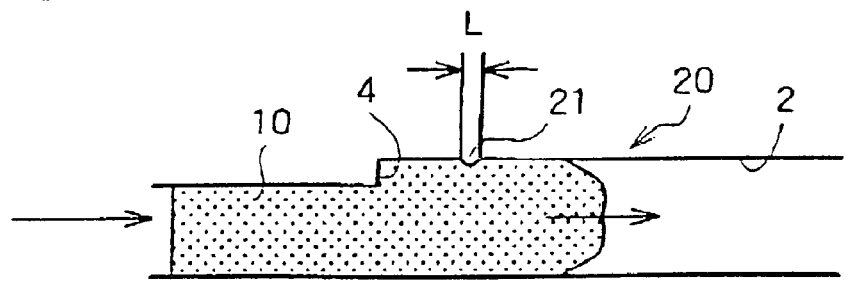
FIG. 13 is an enlarged front sectional view of the stepped part of the resin molding metal mold of FIG. 12 when the molten resin is being injected thereto.

FIGS. 11–15 show a second embodiment of the resin molding device, resin molding method and resin molded product of this invention, and FIG. 11 is a plan view of a resin molding metal mold 20 according to the second embodiment of the resin molding device, resin molding method and resin molded product of this invention.

This embodiment is applied to the same resin molding metal mold as the resin molding metal mold 1 of the first embodiment, and the same reference number is imparted to the same component as in the first embodiment to omit the detailed description therefor.

In FIG. 11, the resin molding metal mold 20 that is a resin molding device has a plurality of gates 3 opened to a cavity 2 in the central part, and the cavity 2 is formed in a hollow disc shape. In the resin molding metal mold 20, a molten resin 10 introduced into the cavity 2 through the gates 3 spreads and flows radially from the central part of the cavity 2 as shown by arrows in FIG. 11 to fill the cavity 2.

A stepped part 4 is circularly formed within the cavity 2, as shown in FIGS. 11–15, orthogonally to the flowing direction of the molten resin 10 introduced into the cavity 2 from the gate 3 or circumferentially, and a fine slit 21 is circularly formed on the outer side of the stepped part 4, as shown in FIGS. 11–14, orthogonally to the flowing direction of the molten resin 10 or circumferentially. The slit 21 is allowed to communicate with the outside air out of the resin molding metal mold 20.

The slit 21 is formed in a width L of about 1–30 μm in the direction where the molten resin 10 crosses over the slit 21 during flowing in the cavity 2 or in the circumferential direction where the molten resin 10 flowing radially from the central part of the cavity 2 crosses over it.

The effect of this embodiment is described. In the resin molding metal mold 20 of this embodiment, the molten resin 10, when injected from the gates 3 formed in the central part of the cavity 2, flows radially from the central part of the cavity 2 as shown by the arrows in FIG. 11, and successively passes the circumferentially formed stepped part 4 and slit 21 to fill the outermost part direction of the cavity 2.

The cavity 2 is formed so that the opening diameter is increased with the stepped part 4 as the boundary as shown in FIGS. 12–15 to change the molded product shape from a thin part to a thick part. When the molten resin 10 flows from the thin part to the thick part, its pressure is released due to the presence of the stepped part 4 within the cavity 2 to weaken the force of pressing the molten resin 10 to the wall surface of the resin molding metal mold 20. Accordingly, a non-transfer part is apt to be formed in the edge part of the stepped part 4 because the molten resin 10 is not sufficiently intruded thereto. The non-transfer part is apt to start to induce a sink in cooling process because its adhesive force to the resin molding metal mold 20 is smaller than that of the other part. It is particularly effective to set the step S of the stepped part 4 to s≧t/10 to the thickness t of the molded product.

Since the surface layer of the molten resin 10 is closely fitted to the resin molding metal mold 20 in the flowing process, the heat of the molten resin 10 is instantaneously drained by the resin molding metal mold 20 to solidify it.

The resin molding metal mold 20 has the slit 21 formed in the thick part orthogonally to the flowing direction of the molten resin 10. Therefore, the molten resin 10 flowing while closely fitting to the inner surface of the resin molding metal mold 20 by the fountain flow cannot get into the fine slit 21 when it flows on the slit 21, and moves in contact with the outside air introduced from the slit 21 to generate a sink in the thick part by the outside air introduced from the slit 21.

Figure 24:
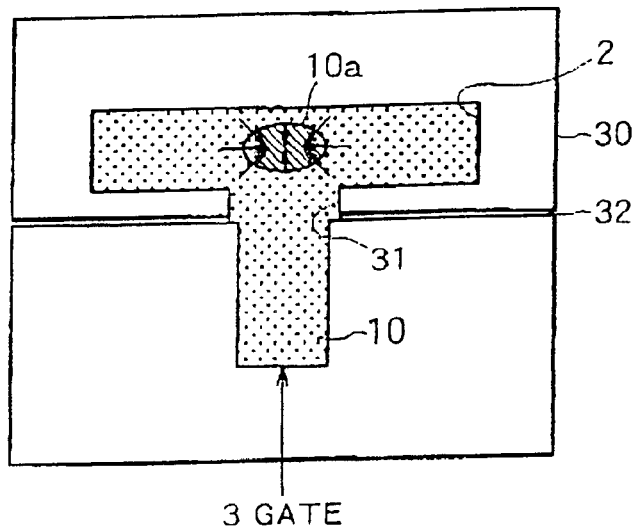
FIG. 24 is a front sectional view of the resin molding metal mold of FIG. 22 showing the state where the cavity is filled with the molten resin, and a sink is generated.

Namely, even in the pressure retaining process up to the sealing of the gates 3 by the cooling and solidification of the resin 10 in the gate part after the completion of the filling of the molten resin 10 into the cavity 2, the part facing the slit 21 of the resin 10 is in contact with the outside air as shown in FIG. 24 to keep the state more easily generable of sink than the other part.

Figure 14:
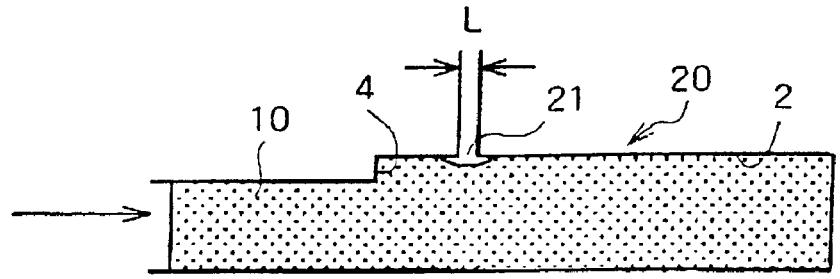
FIG. 14 is an enlarged front sectional view of the stepped part of the resin molding metal mold of FIG. 13 showing the state where the molten resin injected thereto causes a sink in the slit part.
Figure 15:
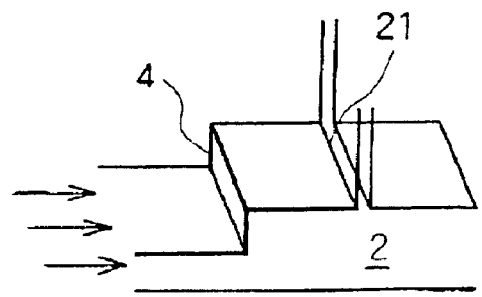
FIG. 15 is a perspective view of the stepped part of the resin molding metal mold of FIG. 13.

The cooling process is performed after the completion of the pressure retaining process. In this cooling process, the resin 10 is generally contracted in volume. The resin 10 of the surface part continuously keeps the close fitting with the resin molding metal mold 20 while the pressure of the resin 10 in the resin molding metal mold 20 is not zero. However, when the resin pressure in the resin molding metal mold 20 lowers according to cooling and gets close to zero, the central part of the thick part is cooled, solidified and contracted last as shown in FIG. 14. Accordingly, the resin 10 around the central part of the thick part is pulled toward the central part of the thick part. Since the surface layer part of the resin 10 having the weakest close fitting force to the resin molding metal mold 20 is easily separated from the resin molding metal mold 20, the resin 10 starts to move toward the central part of the thick part, consequently forming a recessed non-transfer part called sink.

In this resin molding metal mold 20 of this embodiment, however, since the slit 21 is formed in the thick part and in contact with the outside air, only the part facing the slit 21 is laid in the state where the close fitting force to the resin molding metal mold 20 is released, and the part facing the slit 21, where the close fitting force to the resin molding metal mold 20 is weak, is easily pulled toward the thick central part and moved.

Accordingly, the sink can be selectively generated in the resin 10 part facing the slit 21, as shown in FIG. 14, or the molded product part to form the non-transfer part.

When the sink is once generated, this part is relatively higher in temperature than the part making contact with the resin molding metal mold 20 since the cooling from the resin molding metal mold 20 is arrested, and easily moved because of the low viscosity of the resin 10 to progress the sink.

This sink is progressed, whereby the part subjected to transfer can be less pulled to the thick part by this portion to prevent the sink or contracting deformation of the transfer part.

Accordingly, the slit 21 is formed in the resin molding metal mold 20 of the position forming the non-transfer part of the molded product, whereby the non-transfer part can be formed in the part facing the slit 21 to improve the transfer property of the transfer part, so that the shape precision of the molded product can be improved, and transfer of surface state such as wrinkle, transfer of fine surface shape or the like can be easily and precisely performed.

It is more effective to enlarge the sink in the non-transfer part of the part facing the slit 21. However, when the pressure of the resin 10 is too high in the injection filling process of filling the molten resin 10 and the pressure retaining process, the resin 10 is cooled and solidified before the internal pressure of the resin 10 becomes zero, the sin is hardly generated, and the generation effect of sink in the non-transfer part of the part facing the slit 21 cannot be properly provided. In this embodiment, also, it is important to perform a low-pressure molding in the injection filling process and the pressure retaining process.

When the low-pressure molding is performed, the residual stress to the molded product can be reduced, and a molded product excellent in aging stability can be molded.

Figure 16:
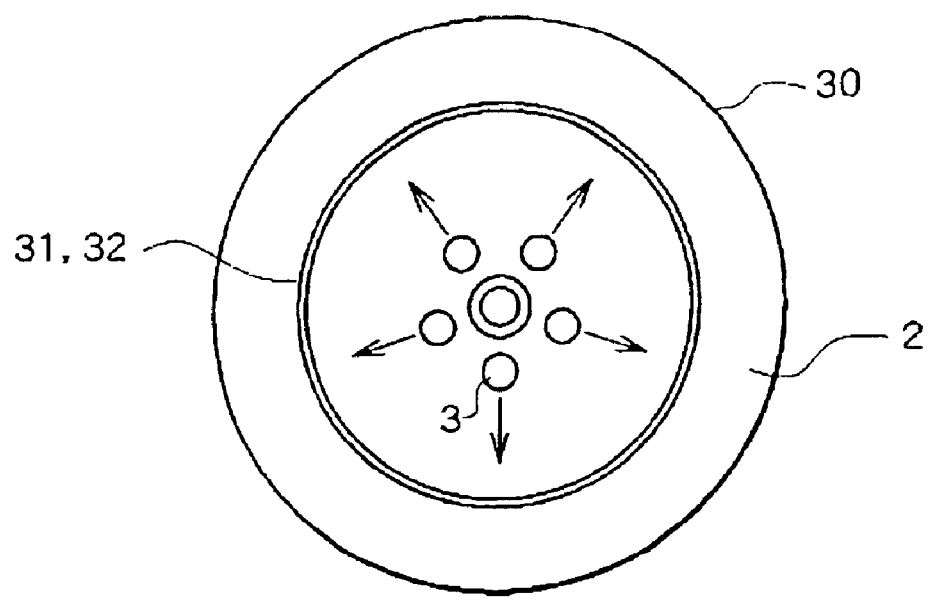
FIG. 16 is a plan sectional view of a resin molding metal mold according to a third embodiment of the resin molding device, resin molding method and resin molded product of this invention.
Figure 17:
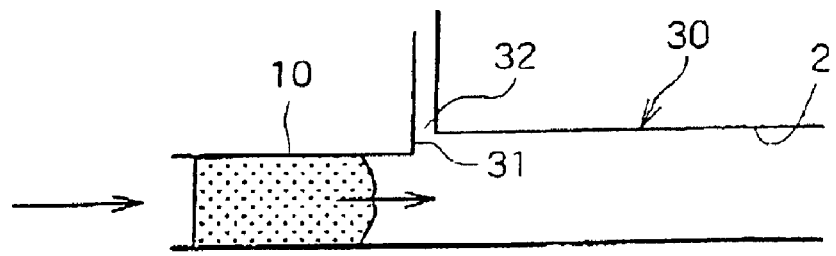
FIG. 17 is an enlarged front sectional view of the stepped part of the resin molding metal mold of FIG. 16.
Figure 18:
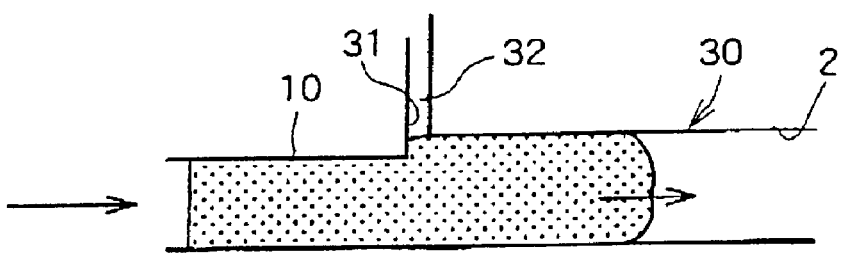
FIG. 18 is an enlarged front sectional view of the stepped part of the resin molding metal mold of FIG. 17 where the molten resin is being injected thereto.
Figure 19:
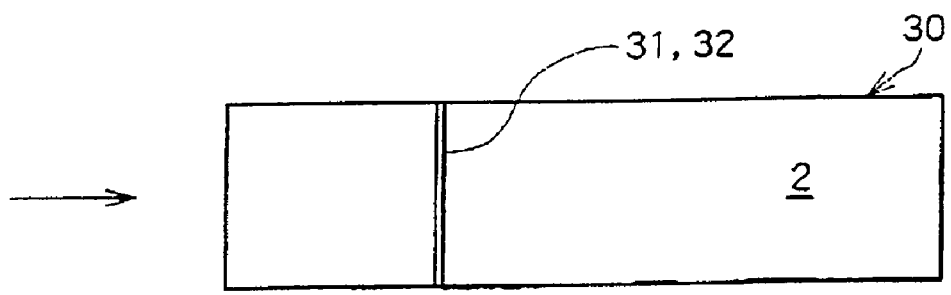
FIG. 19 is a plan view of the stepped part of the resin molding metal mold of FIG. 17.

FIGS. 16–26 show a third embodiment of the resin molding device, resin molding method and resin molded product of this invention, and FIG. 16 is a plan view of a resin molding metal mold 30 for molding a resin molded product according to the third embodiment of the resin molding device, resin molding method and resin molded product of this invention.

This embodiment is applied to the same resin molding metal mold as the resin molding metal mold 1 of the first embodiment, and the same reference number is imparted to the same component as in the first embodiment to omit the detailed description therefor.

In FIG. 16, the resin molding metal mold 30 that is a resin molding device has a plurality of gates 3 opened to a cavity 2 in the central part, and a molten resin 10 introduced into the cavity 2 from the gates 3 radially extends and flows to fill the cavity 2 as shown by arrows in FIG. 16.

A stepped part 31 is circularly formed within the cavity 2 as shown in FIGS. 16–21 orthogonally to the flowing direction of the molten resin 10 introduced into the cavity 2 firm the gates 3 or circumferentially, and a slit 32 is formed in the part of the stepped part 31. The slit 32 is formed on the thick part side of the stopped part 31 and allowed to communicate with the outside air in the outside of the resin molding metal mold 30.

Figure 20:
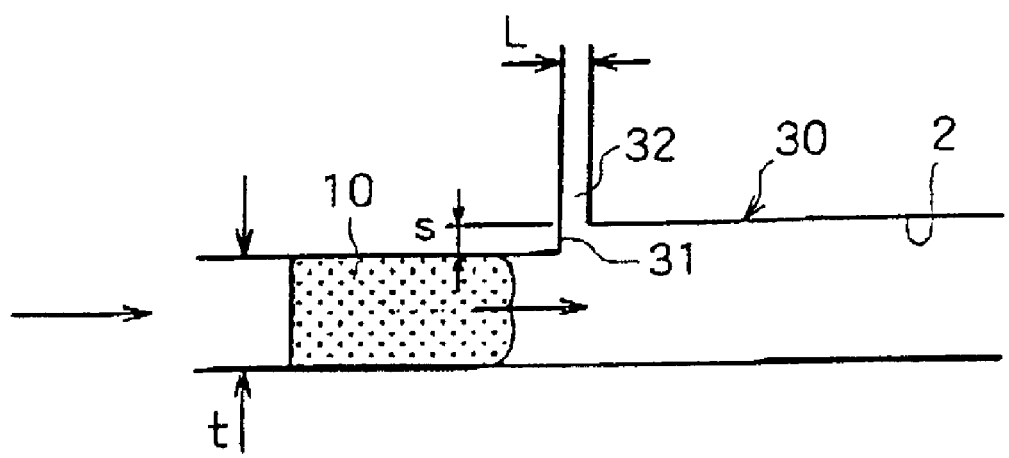
FIG. 20 is an enlarged front sectional view of the stepped part of FIG. 17 dimensionally showing the steps and thickness thereof.
Figure 21:
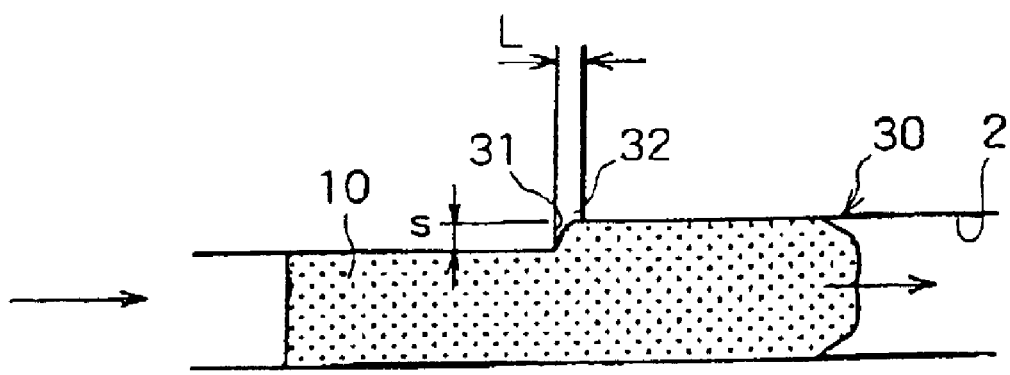
FIG. 21 is an enlarged front sectional view of the stepped part of FIG. 17 dimensionally showing the steps and thickness thereof when the molten resin is being injected to the stepped part.

The cavity 2 is formed so that the opening diameter is larger in the outer side of the stepped part 4 as shown in FIGS. 17, 18, 20 and 21, and the stepped part 4 is formed as large as possible within a range allowable in the whole design of a molded product with a step S of 20 µm or more as shown in FIGS. 20 and 21. It is particularly desirable to set the step S to s≧t/10 to the thickness t of the molded product.

The slit 32 is formed in a width L of about 1–30 µm in the direction where the molten resin 10 crosses over the slit 32 during flowing in the cavity 2 or the circumferential direction where the molten resin 10 flowing radially from the central part of the cavity 2 crosses over it.

Figure 22:
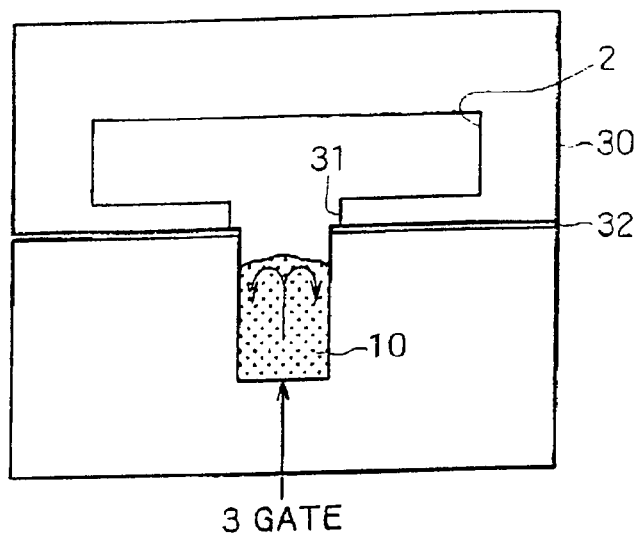
FIG. 22 is a front sectional view of the resin molding metal mold of FIG. 16.
Figure 23:
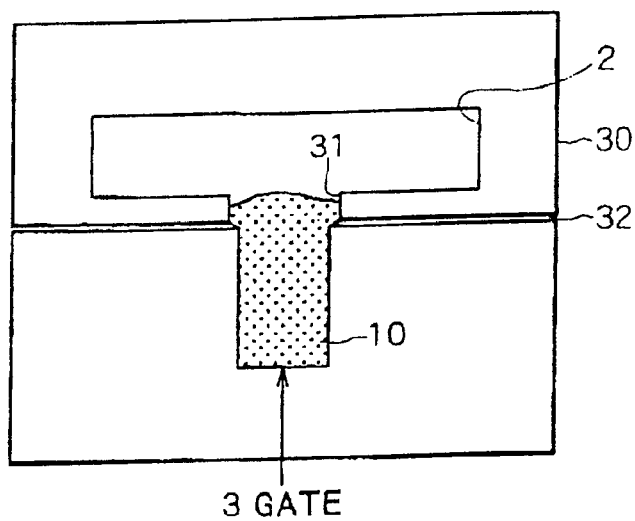
FIG. 23 is a front sectional view of the resin molding metal mold of FIG. 22 in the state where the molten resin is being injected up to the stepped portion thereof.

The effect of this embodiment is described. In the resin molding metal mold 30 of this embodiment, as shown in FIG. 23, the molten resin 10, when injected to the central part of the cavity 2 from the gates 3, flows radially from the central part of the cavity 2 as shown in FIGS. 16 and 22, and successively passes the circumferentially formed stepped part 31 and slit 32 to fill the outermost part direction of the cavity 2.

The cavity 2 is formed so that the opening diameter is increased with the stepped part 31 as the boundary as shown in FIGS. 16–18 and 20–24 to change the molded product shape from a thin part to a thick part. When the molten resin 10 flows from the thin part to the thick part, its pressure is released due to the presence of the stepped part 31 within the cavity 2 to weaken the force of pressing the molten resin 10 to the wall surface of the resin molding metal mold 30. Accordingly, a non-transfer part is apt to be formed in the edge part of the stepped part 31 because the molten resin 10 is not sufficiently intruded thereto. The non-transfer part is apt to start to induce a sink in the cooling process since its adhesive force to the resin molding metal mold 30 is smaller than that of the other part. It is particularly effective to set the step S of the stepped part 31 to s≧t/10 to the thickness t of the molded product.

Since the slit 32 is formed in the stepped part 31, the molten resin 10 flowing while closely fitting to the inner surface of the resin molding metal mold 30 by the fountain flow does not get into the edge part having the slit 32 formed thereon as described above in the stepped part 31, and cannot intrude into the fine slit 32 when it flows on the slit 32. Accordingly, the molten resin 10 moves in contact with the outside air introduced from the slit 32 to cause a sink in the part facing the stepped part 31 by the outside air introduced from the slit 32.

Namely, even in the pressure retaining precess up to the sealing of the gates 3 by the cooling and solidification of the resin 10 of the gate part after the completion of the filing of the molten resin 10 into the cavity 2, the part facing the slit 32 of the resin 10 is still in contact with the outside air as shown in FIG. 24 to keep the state more easily generable of sink than the other part. At this time, a molten resin 10a, among the molten resin 10, in the central part of the cavity 2 shown by an elliptic shape in FIG. 24 is laid in a state higher in temperature than the circumference.

The cooling process is performed after the completion of the pressure retaining process. In this cooling process, the resin 10 is generally contracted in volume. The resin 10 of the surface part continuously keeps the close fitting with the resin molding metal mold 30 while the pressure of the resin 10 within the resin molding metal mold 30 is not zero. However when the resin pressure within the resin molding metal mold 30 lowers according to cooling and gets close to zero, the central part 10a of the thick part is cooled, solidified and contracted last as shown in FIG. 24. The resin 10 around the central part 10a of the thick part is thus pulled toward the central part 10a of the thick part as shown by an arrow in FIG. 24.

Figure 25:
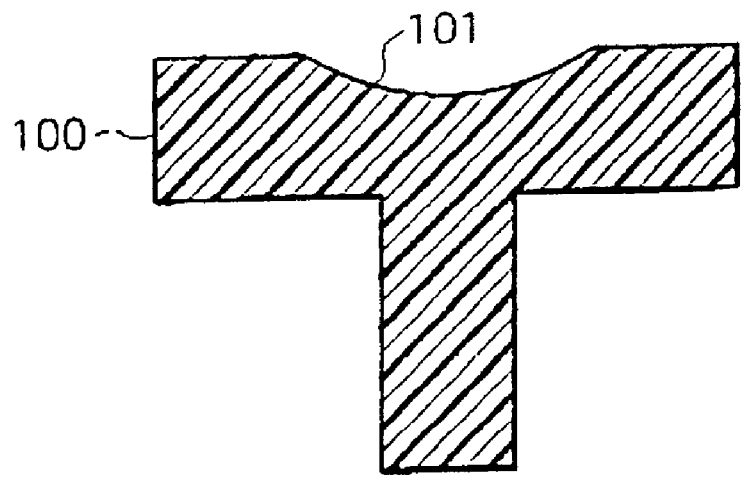
FIG. 25 is a front view of a molded product formed by use of a conventional resin molding metal mold where a sink is generated in the transfer part.

Since the surface layer part of the resin 10 having the weakest close fitting force to the resin molding metal mold 30 is easily separated from the resin molding metal mold 30, the resin 10 starts to move toward the central part of the thick part in the past to form a recessed non-transfer part 101 called sink in a molded product 100 as shown in FIG. 25.

In the resin molding metal mold 30 of this embodiment, however, since the slit 32 is formed in the stepped part 31 and in contact with the outside air, only the part facing the slit 32 of the stepped part 31 is laid in the state where the close fitting force to the resin molding metal mold 30 is released, and the part facing the slit 32, where the close fitting force to the resin molding metal mold 30 is weak, is easily pulled toward the thick central part and moved.

Accordingly, the sink can be selectively generated in the resin 10 part facing the slit 32 or the non-transfer part.

When the sink is generated once, this part is relatively high in temperature than the part making contact with the resin molding metal mold 30 because the cooling from the resin molding metal mold 30 is arrested, and more easily moved because of the low viscosity of the resin 10 to progress the sink.

This sink is progressed, whereby the part subjected to transfer can be less pulled to the thick part by this portion to prevent the sink or contracting deformation of the transfer part.

Figure 26:
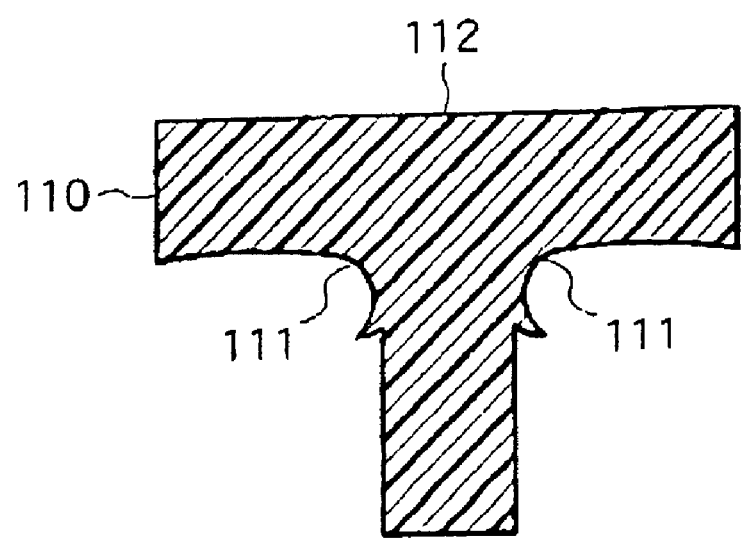
FIG. 26 is a front view of a molded product formed by use of the resin molding metal mold of FIG. 16 where a sink is generated in the transfer part.

The slit 32 is formed in the resin molding metal mold 30 of the position forming a non-transfer part 111 of a molded product 110 as shown in FIG. 26, whereby the non-transfer part 111 can be formed in the part facing the slit 32 to improve the transfer property of a transfer part 112, so that the shape precision of the molded product 110 can be improved, and transfer of surface state such as wrinkle, transfer of fine surface shape or the like can be easily and precisely performed.

It is more effective to enlarge the sink in the non-transfer part of the part facing the slit 32. However, when the pressure of the molten resin 10 is too high in the injection filling process of filling the molten resin 10 and the pressure retaining process, the resin 10 is cooled and solidified before the internal pressure of the resin 10 becomes zero, the sink is hardly generated, and the generation effect of sink in the non-transfer part 111 of the part facing the slit 32 cannot be properly provided. Accordingly, it is important to perform a low-pressure molding in the injection filling process and the pressure retaining process.

When the low-pressure molding is performed, the residual stress to the molded product can be reduced, and a molded product excellent in aging stability can be molded.

Figure 27:
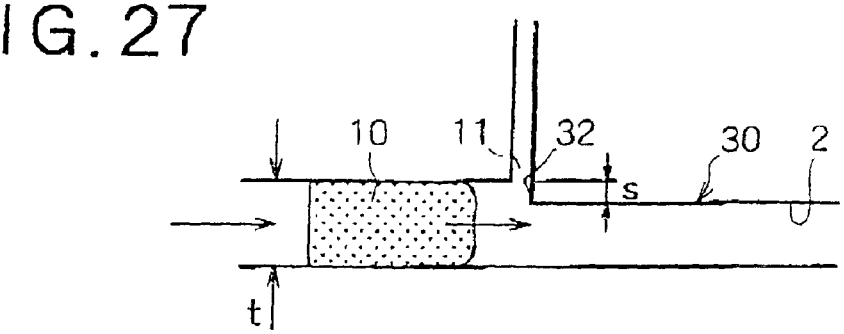
FIG. 27 is an enlarged front sectional view of the stepped part of the resin molding metal mold where the cavity is changed from a large opening diameter state to a small opening diameter state.
Figure 28:
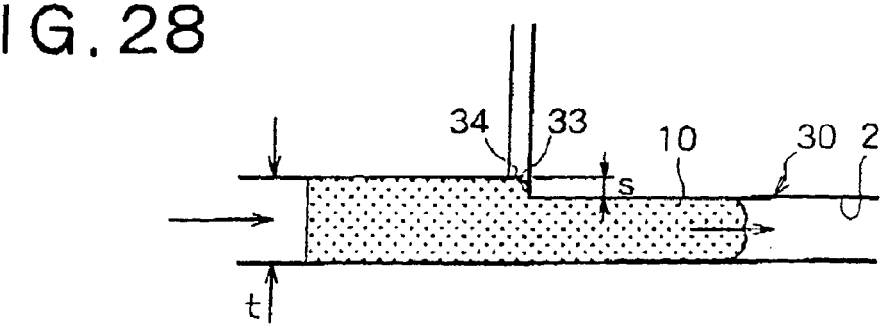
FIG. 28 is an enlarged front sectional view of the stepped part of the resin molding metal mold of FIG. 27 in the state where the molten resin is injected thereto.

In this embodiment, the cavity 2 is changed from a small opening diameter state to a large state in the stepped part 31 so as to change the molded product shape from a thin part to a thick part. The stepped part 33 may be formed so that the cavity 2 is changed from the large opening state to the small state, as shown in FIGS. 27 and 28, and a slit 34 may be formed in the stepped part 33. In this case, also, the same effect as the above embodiment can be provided.

Figure 29:
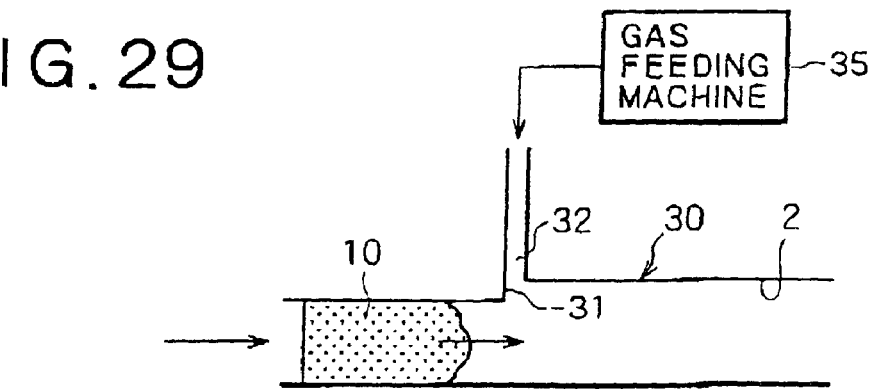
FIG. 29 is a partially enlarged front sectional view of the resin molding metal mold of FIG. 16 in the state where a gas feeding machine is connected to the slit.

In this embodiment, a gas feeding machine 35 such as pump may be connected to the slit 32 as shown in FIG. 29 to introduce a prescribed gas such as air into the cavity 2 through the slit 32. In this case, the gas to be introduced by the gas feeding machine 35 may have a low pressure of about 1–6 kgf/cm2.

The gas feeding machine 35 is driven during and after the filling of the molten resin 10 into the cavity 2 or only after the filling to introduce the gas into the cavity 2 through the slit 32.

According to this, the resin 10 of the part facing the slit 32 can be more efficiently cooled to hasten the timing of sink generation, and the sink of the resin 10 of this part can be enlarged more to improve the transfer property of the transfer surface further more. When the gas feeding machine 35 is driven after the filling of the resin, particularly, the resin 10 starts to sink at the timing when the resin pressure becomes lower than the gas introducing pressure before the internal pressure of the resin 10 of the part facing the slit 32 becomes zero, the sink of the resin 10 of this part can be enlarged more to improve the transfer property of the transfer surface further more.

Figure 30:
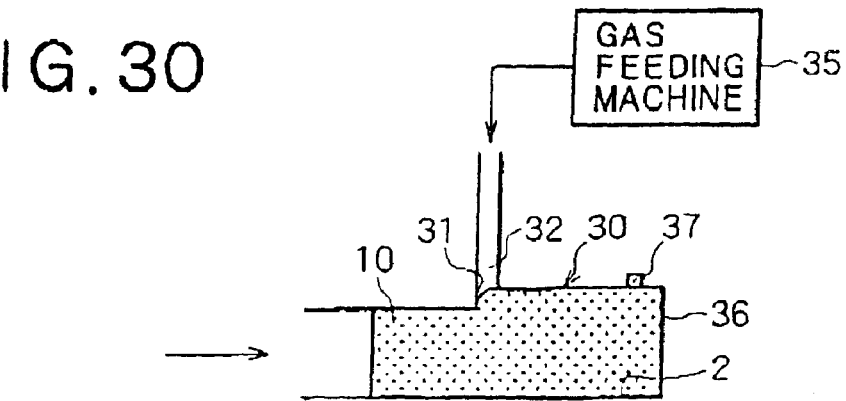
FIG. 30 is a partially enlarged front sectional view of the resin molding metal mold of FIG. 29 in the state filled with the resin.

In this embodiment, as shown in FIG. 30, a recessed part 37 for forming a protruding projection or rib on the molded product may be further formed on the cavity 2 surface of the resin molding metal mold 30 between the slit 32 and a transfer surface 36. The gas feeding machine 35 is connected to the slit 32, and driven during and after the filling of the resin 10 into the cavity 2 or only after the filling to introduce the gas into the cavity 2 through the slit 32.

According to this, the generated surface sink area cannot spread over the rib even if the transfer surface 36 is present in a position closer to the sink generating position of the resin 10 facing the slit 32 because the resin in the molded product protruding rib part is rapidly cooled and solidified. Accordingly, the surface sink generated relatively near the transfer surface 36 can be prevented from extending to the transfer surface and deteriorating the precision of the transfer surface 36 to improve the transfer property of the transfer surface 36 further more.

In FIG. 30, the same gas feeding machine 35 as in FIG. 29 is connected to the slit 32, but the same effect can be obtained without the gas feeding machine 35. When the gas feeding machine 35 is provided, the generated surface sink area cannot spread over the rib even if the transfer surface 36 is present in a position close to the sink generating position of the resin 10 facing the slit 32 because the resin of the molded product protruding rib part is rapidly cooled and solidified. Accordingly, the surface sink generated relatively near the transfer surface 36 can be prevented from extending to the transfer surface 36 and deteriorating the precision of the transfer surface 36 to improve the transfer property of the transfer surface 36 further more.

Figure 31:
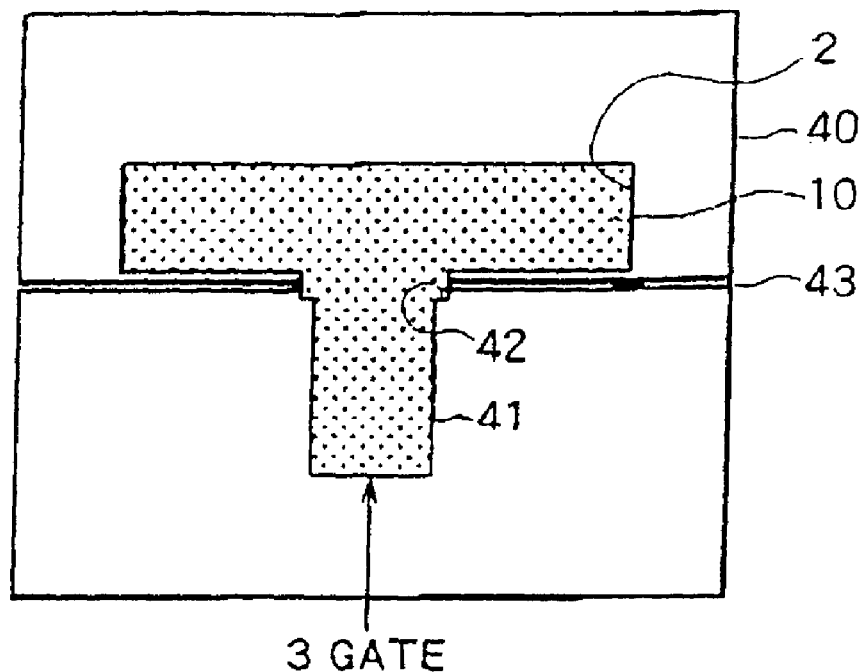
FIG. 31 is a front sectional view of a resin molding metal mold according to a fourth embodiment of the resin molding device, resin molding method and resin molded product of this invention.
Figure 32:
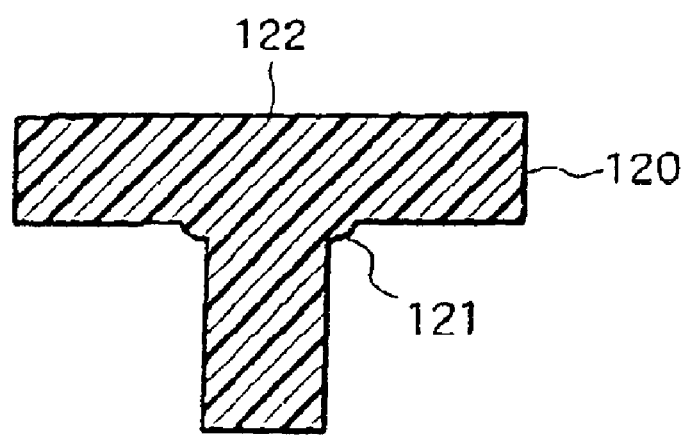
FIG. 32 is a front view of a molded product formed by use of the resin molding metal mold of FIG. 31.

FIGS. 31 and 32 show a fourth embodiment of the resin molding device, resin molding method and resin molded product of this invention, and FIG. 31 is a front sectional view of a resin molding metal mold 40 for molding a resin molded product according to the fourth embodiment of the resin molding device, resin molding method and resin molded product of this invention.

This embodiment is applied to the same resin molding metal mold as the resin molding metal mold 1 of the first embodiment, and the same reference number is imparted to the same component as in the first embodiment to omit the detail description therefor.

In FIG. 31, the resin molding metal mold 40 that is a resin molding device has a rib part 41 formed in the lower part of a flat plate-shaped cavity 2 and a plurality of gates 3 formed in the central part of the lower surface of the rib part 41, and a molten resin 10 introduced into the cavity 2 from the gates 3 through the rib part 41 spreads and flows radially from the rib part 41 in the central part of the cavity 2 to fill the cavity 2.

A stepped part 42 is formed in the vicinity of the cavity 2 of the rib part 41 in the circumferential direction of the rib part 41, and a slit 43 is formed in the portion of the stepped part 42. The slit 43 is circumferentially formed on the thick part side of the stepped part 42 and allowed to communicate with the outside air.

The effect of this embodiment is described. In the resin molding metal mold 40 of this embodiment, as shown in FIG. 31, the molten resin 10, when injected from the gates 3 formed on the lower surface central part of the rib part 41, rises in the rib part 41 and successively passes the stepped part 42 and slit 32 formed in the circumferential direction of the rib part 41 to fill the cavity 2.

The rib part 41 is formed so that the opening diameter is larger with the stepped part 42 as the boundary to change the molded product shape from a thin part to a thick part. When the molten resin 10 flows from the thin part to the thick part, its pressure is released due to the presence of the stepped part 42 in the rib part 41 of the cavity 2 to weaken the force of pressing the molten resin 10 to the wall surface of the resin molding metal mold 40. A non-transfer part is thus apt to be formed in the edge part of the stepped part 42 because the molten resin 10 is not sufficiently intruded thereto. The non-transfer part is apt to start to induce a sink in the cooling process since its adhesive force to the resin molding metal mold 40 is smaller than that of the other part.

Since the slit 43 is formed in the stepped part 42, the molten resin 10 flowing while closely fitting to the inner surface of the resin molding metal mold 40 by the fountain flow does not get into the edge part having the slit 43 formed thereon as described above in the stepped part 42, and cannot intrude into the fine slit 43 when it flows on the slit 43. Accordingly, the molten resin 10 is moved in contact with the outside air introduced from the slit 43 to generate a sink in the part facing the stepped part 42 by the outside air introduced from the slit 43.

Accordingly, the sink can be selectively generated in the resin 10 part facing the slit 43. When the sink is once generated, this part is relatively higher in temperature than the part making contact with the resin molding metal mold 40 because the cooling from the resin molding metal mold 40 is arrested, and also more easily moved because of the low viscosity of the resin 10 to progress the sink.

This sink is progressed, whereby the part subjected to transfer is less pulled to the thick part by this portion to prevent the sink or contracting deformation of the transfer part.

Accordingly, the slit 43 is formed in the resin molding metal mold 40 of the position form a non-transfer part 121 of a molded product 120 as shown in FIG. 32, whereby the non-transfer part 121 is formed in the part facing the slit 43 to improve the transfer property of a transfer part 122, so that the shape precision of the molded product 120 can be improved, and transfer of surface state such as wrinkle, transfer of fine surface shape or the like can be easily and precisely performed.

Figure 33:
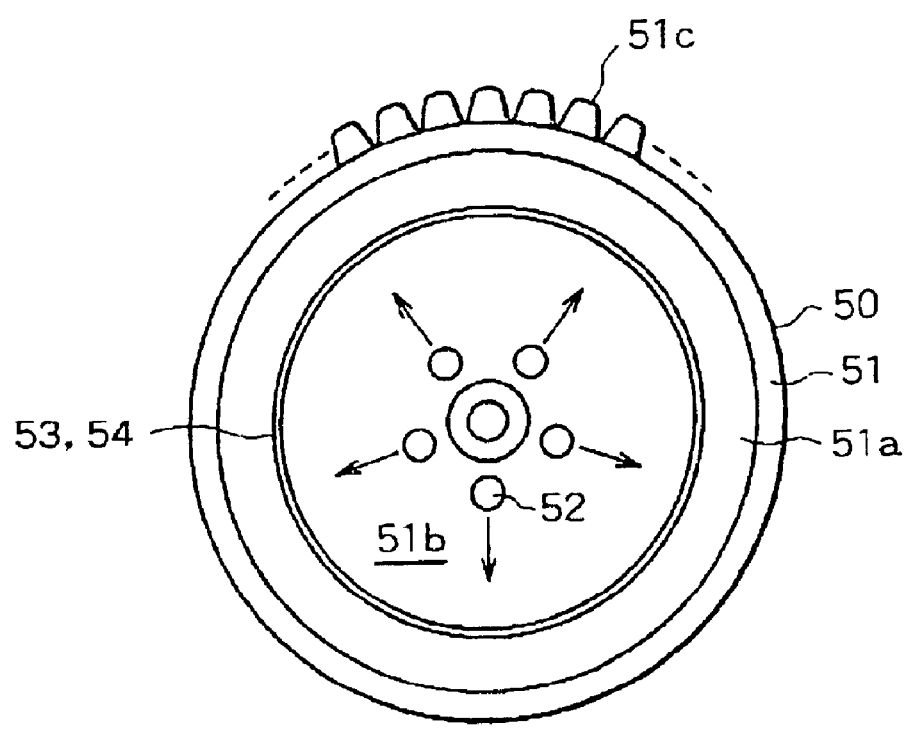
FIG. 33 is a plan sectional view of a resin molding metal mold according to a fifth embodiment of the resin molding device, resin molding method and resin molded product of this invention.
Figure 34:
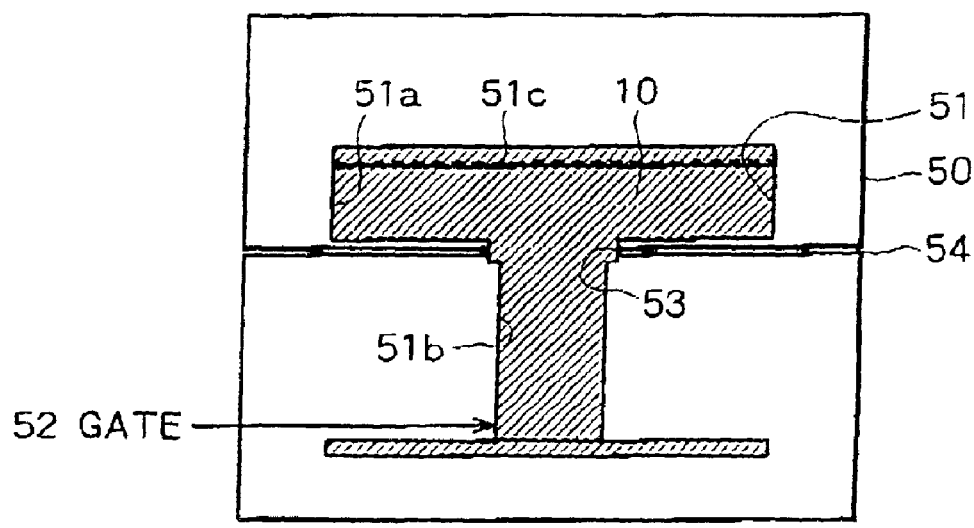
FIG. 34 is a front sectional view of the resin molding metal mold of FIG. 33.
Figure 35:
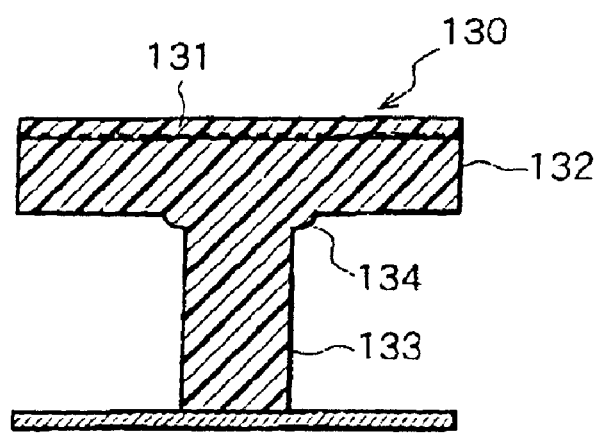
FIG. 35 is a front view of a gear as the molded product formed by use of the resin molding metal mold of FIG. 33.

FIGS. 33–35 show a fifth embodiment of the resin molding device, resin molding method and resin molded product of this invention, and FIG. 33 is a plan view of a resin molding metal mold 50 for molding a resin molded product according to the fifth embodiment of the resin molding device, resin molding method and resin molded product of this invention, and FIG. 34 is a front sectional view of the resin molding metal mold 50.

In FIGS. 33 and 34, the resin molding metal mold 50 comprises a cavity 51 having the shape of a gear 130 (refer to FIG. 35) as molded product in the inner part, and the cavity 51 comprises a major diameter part 51a for forming a gear part 132 having the tooth part 131 of the gear 130 formed thereon, a minor diameter part 51b for forming a shaft part 133 of the gear 130, and a tooth part forming part 51c for forming the tooth part 131 of the gear 130 protrusively formed on the outer circumferential surface of the major diameter part 51a.

The resin molding metal mold 50 further comprises a gate 52 communicating with the minor diameter part 51b of the cavity 51 and a one-step stepped part 53 circumferentially formed in the boundary part between the minor diameter part 51b and the major diameter part 51a. The stepped part 53 is stepped so that the diameter is increased from the minor diameter part 51b to the major diameter part 51a. A slit 54 is formed in the stepped part 53, and the slit 54 is circumferentially formed on the major diameter side (thick side) of the stepped part 53 and allowed to communicate with the outside air.

The effect of this embodiment is described. In the resin molding metal mold 50 of this embodiment, as shown in FIG. 33, the molten resin 10, when injected from the gates 62 communicating with the minor diameter part 51b of the cavity 51, rises and fails on the minor diameter part 51b, flows to the lower major diameter part and upper major diameter part 51a of the cavity 51, and successively passes the stepped part 53 and slit 54 formed in the circumferential direction of the minor diameter part 51b to fill the major diameter part 51a.

The molten resin 10 flowing from the minor diameter part 51b of the cavity 51 to the major diameter part 51a flows radially and flows into the tooth part forming part 51c.

The minor diameter part 51b is formed so that the opening diameter is increased with the stepped part 53 as the boundary to change the shape of the shaft part 133 of the gear 130 of molded product from a thin part to a thick part. When the molten resin 10 flows from the thin part of the stepped part 53 to the thick part, its pressure is released due to the presence of the stepped part 53 in the minor diameter part 51b of the cavity 51 to weaken the force of pressing the molten resin 10 to the wall surface of the resin molding metal mold 50. Accordingly, a non-transfer part is apt to be formed in the edge part of the stepped part 53 because the molten resin 10 is not sufficiently intruded thereto. The non-transfer part is apt to start to induce a sink in the cooling process because its adhesive force to the resin molding metal mold 50 is smaller than that of the other part.

Since the slit 54 is formed in the stepped part 53, the molten resin 10 flowing while closely fitting to the inner surface of the resin molding metal mold 50 by the fountain flow does not get into the edge part having the slit 54 formed thereon in the stepped part 63 as described above, and cannot get into the fine slit 54 when it flows on the slit 54. Accordingly, the molten resin 10 moves in contact with the outside air introduced from the slit 54 to generate a sink in the part facing the stepped part 53 by the outside air introduced from the slit 54.

Accordingly, the sink can be selectively generated in the resin 10 part facing the slit 54, and when the sink is once generated, this part is relatively higher in temperature than the part making contact with the resin molding metal mold 50 because the cooling from the resin molding metal mold 50 is arrested, and also more easily moved because of the low viscosity of the resin 10 to progress the sink.

This sink is progressed, whereby the part subjected to transfer is less pulled to the thick part by this portion to prevent the sink or contracting deformation of the transfer part.

As shown in FIG. 35, the slit 64 is formed in the resin molding metal mold 50 of the position forming a non-transfer part 134 of the molded product 130, whereby the non-transfer part 134 cam be formed in the part facing the slit 54 to improve the transfer property of the tooth part 131 that is the transfer part, so that the shape precision of the molded product 130 can be improved, and transfer of surface state such as wrinkle, transfer of fine surface shape or the like can be easily and precisely performed.

Figure 36:
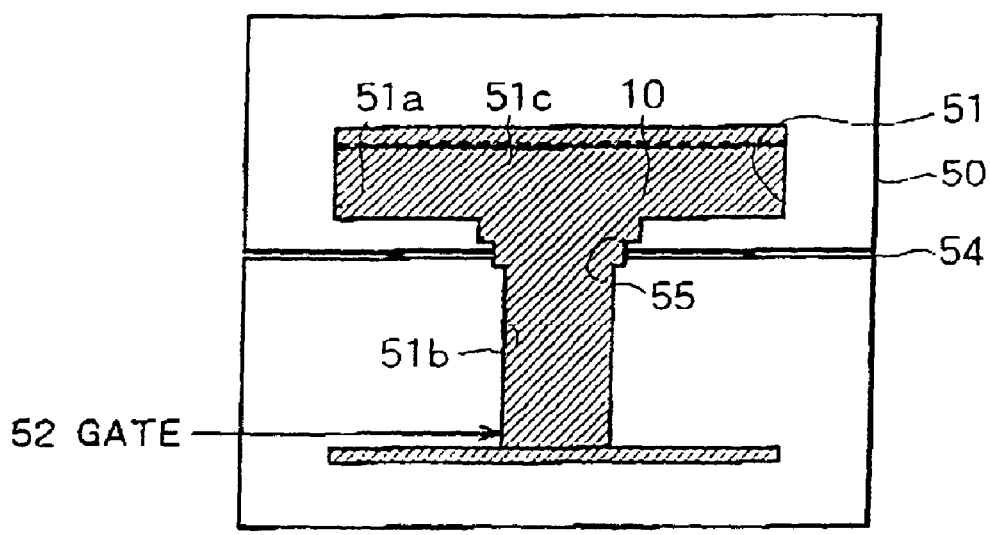
FIG. 36 is a front sectional view of the resin molding metal mold of FIG. 33 where the stepped part of the resin molding metal mold has a plurality of steps.
Figure 37:
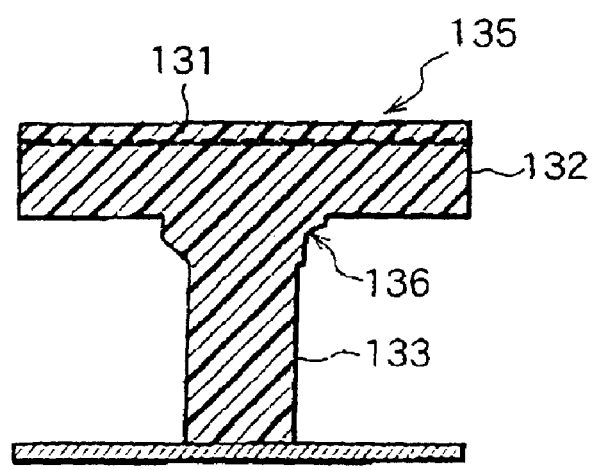
FIG. 37 is a front view of a gear as the molded product formed by use of the resin molding metal mold of FIG. 36.

In this embodiment, although the one-step stepped part 53 is formed on the resin molding metal mold 50, for example, a two-step stepped part 55 as shown in FIG. 36 or a stepped part having many steps may be formed without limiting the number of steps of the stepped part 53 to one to form the slit 54 on the stepped part 55. When a stepped part having a plurality of steps, for example, the two-step stepped part 55 is formed, the sink can be generated in the stepped part 55 in the same manner as described above to form a non-transfer part 136 of a gear 135 as molded product, as shown in FIG. 37, and also make the non-transfer part 136 into a smooth shape.

Figure 38:
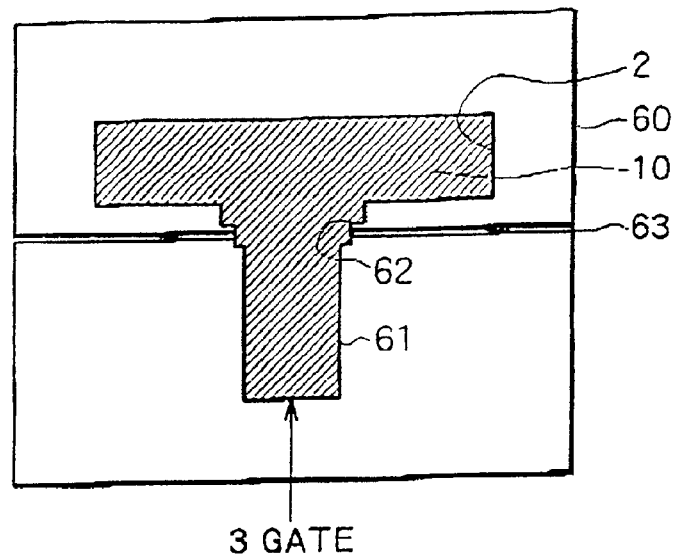
FIG. 38 is a plan sectional view of a resin molding metal mold according to a sixth embodiment of the resin molding device, resin molding method and resin molded product of this invention.
Figure 40:
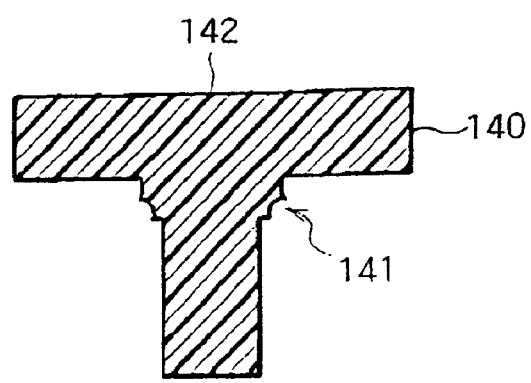
FIG. 40 is a front view of a molded product formed by use of the resin molding metal mold of FIG. 38.

FIGS. 38 and 40 show a sixth embodiment of the resin molding device, resin molding method and resin molded product of this invention, and FIG. 38 is a front sectional view of a resin molding metal mold 60 according to the sixth embodiment of the resin molding device, resin molding method and resin molded product of this invention.

This embodiment is applied to the same resin molding metal mold as the resin molding metal mold 1 of the first embodiment, and the same reference number is imparted to the same component as in the first embodiment to omit the detailed description therefor.

In FIG. 38, the resin molding metal mold 60 that is the resin molding device comprises a rib part 61 formed in the lower part of a flat plate-shaped cavity 2 and a plurality of gates 3 formed in the lower surface central part of the rib part 61, and a molten resin 10 introduced into the cavity 2 from the gates 3 through the rib part 61 spreads and flows radially from the central rib part 61 of the cavity 2 to fill the cavity 2.

Figure 39:
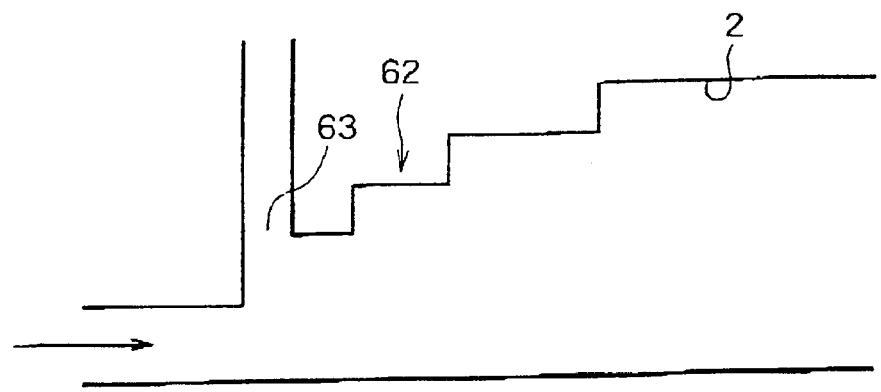
FIG. 39 is an en ed front sectional view of the stepped part of the resin molding metal mold of FIG. 38.

A stepped part 62 is formed in the vicinity of the cavity 2 of the rib part 61 in the circumferential direction of the rib part 61, and a plurality of steps is formed on the stepped part 62 as shown in FIGS. 38 and 39. A slit 63 is formed in the first step of the stepped part 62. The slit 63 is circumferentially formed on the thick part side of the first step of the stepped part 62 and allowed to communicate with the outside air.

The effect of this embodiment is described. In the resin molding metal mold 60 of this embodiment, as shown in FIG. 38, the molten resin 10, when injected from the gates 3 formed in the lower surface central part of the rib part 61, rises in the rib part 61 and successively passes the stepped part 62 and slit 63 formed in the circumferential direction of the rib part 61 to fill the cavity 2.

The rib part 61 is formed so that the opening diameter is gradually increased with the stepped part 62 having a plurality of steps as the boundary to change the shape of a molded product 140 (refer to FIG. 40) from a thin part to a thick part. When the molten resin 10 flows from the thin part to the thick part, its pressure is released over a wide range due to the presence of the stepped part 62 having a plurality of steps on the rib part 61 of the cavity 2 to weaken the force of pressing the molten resin 10 to the wall surface of the resin molding metal mold 60. Accordingly, a non-transfer part is apt to be formed in the edge part of the stepped part 62 because the molten resin 10 is not sufficiently intruded thereto. The non-transfer part is apt to start to induce a sink in the cooling process because its adhesive force to the resin molding metal mold 60 is smaller than that of the other part.

Since the slit 63 is formed on the stepped part 62, the molten resin 10 flowing while closely fitting to the inner surface of the resin molding metal mold 60 by the fountain flow never gets into the edge part having the slit 63 formed thereon in the stepped part 62 as described above, and cannot get into the fine slit 63 when it flows on the slit 63. Accordingly, the molten resin 10 moves in contact with the outside air introduced from the slit 63 to generate a sink over a wide range in the part facing the stepped part 62 having a plurality of steps by the outside air introduced firm the slit 63.

Accordingly, the sink can be selectively generated over a wide range in the resin 10 part facing the slit 63, and when the sink is once generated, this part is relatively higher in temperature than the part making contact with the resin molding metal mold 60 because the cooling from the resin molding metal mold 60 is arrested, and also more easily moved because of the low viscosity of the resin 10 to progress the sink.

This sink is progressed, whereby the part subjected to transfer is less pulled to the thick part by this portion to prevent the sink or contracting deformation of the transfer part.

As shown in FIG. 40, the stepped part 62 having a plurality of steps and the slit 63 are formed in the resin molding metal mold 60 in the position forming a non-transfer part 141 of the molded product 140, whereby the non-transfer part 141 is formed in the part facing the stepped part 62 and the slit 63 to improve the transfer property of a transfer part 142, so that the shape precision of the molded product 140 can be improved, and transfer of surface state such as wrinkle, transfer of fine surface shape or the like can be easily and precisely performed.

Figure 41:
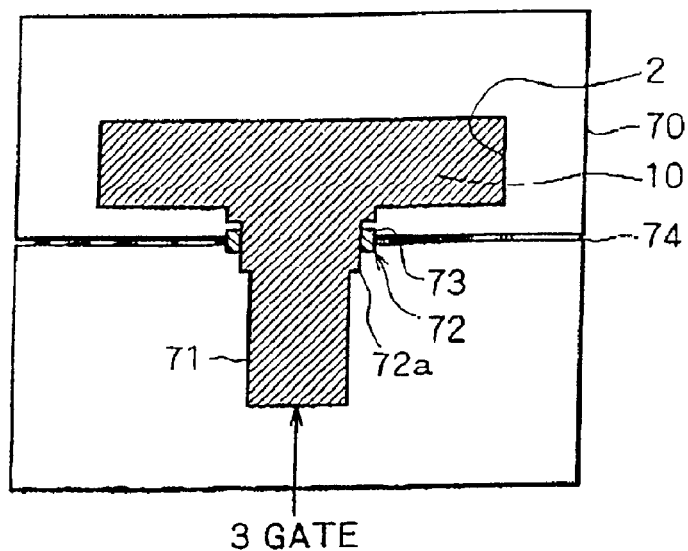
FIG. 41 is a front sectional view of a resin molding metal mold according to a seventh embodiment of the resin molding device, resin molding method and resin molded product of this invention.
Figure 42:
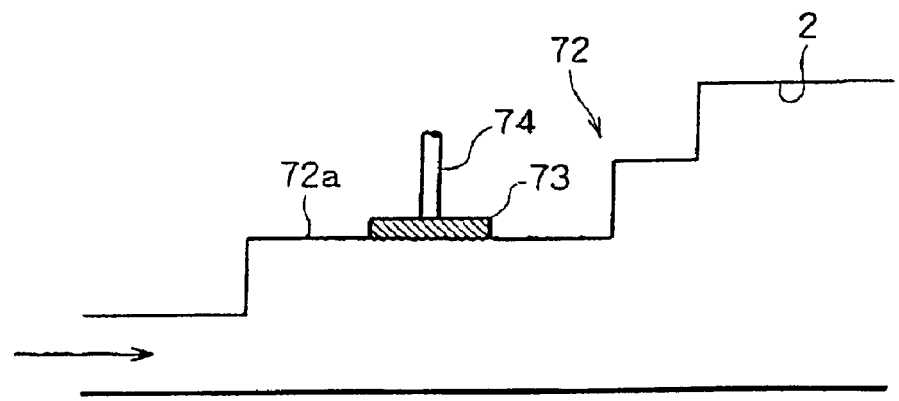
FIG. 42 is an enlarged front sectional view of the stepped part of the resin molding metal mold of FIG. 41.
Figure 43:
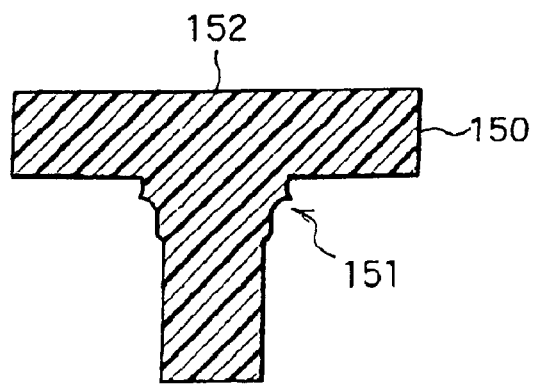
FIG. 43 is a front view of a molded product formed by use of the resin molding metal mold of FIG. 41.

FIGS. 41–43 show a seventh embodiment of the resin molding device, resin molding method and resin molded product of this invention, and FIG. 41 is a front sectional view of a resin molding metal mold 70 according to the seventh embodiment of the resin molding device, resin molding method and resin molded product of this invention.

This embodiment is applied to the same resin molding metal mold as the resin molding metal mold 1 of the first embodiment, and the same reference number is imparted to the same component as in the first embodiment to omit the detailed description therefor.

In FIG. 41, the resin molding metal mold 70 that is the resin molding device comprises a rib part 71 formed in the lower part, of a flat plate-shaped cavity 2 and a plurality of gates 3 formed in the lower surface central part of the rib part 71, and a molten resin 10 introduced into the cavity 2 from the gates 3 through the rib part 71 spreads and flows radially from the central rib part 71 of the cavity 2 to fill the cavity 2.

A stepped part 72 is formed in the vicinity of the cavity 2 of the rib part 71 in the circumferential direction of the rib part 71, and the stepped part 72 comprises a plurality of steps and also a broad step 72 as shown in FIGS. 42 and 43. An outside air inlet part 73 is circularly formed in the broad step 72a part of the stepped part 72 orthogonally to the flowing direction of the molten resin 10 or circumferentially, and the outside air inlet part 73 is allowed to communicate with the outside air through a communicating passage 73 opened to the outside of the resin molding metal mold 70 as shown in FIG. 41.

The outside inlet part 73 is formed of a porous member, at least one fine slit (clearance), or a movable member.

The effect of this embodiment is described. In the resin molding metal mold 70 of this embodiment, as shown in FIG. 41, the molten resin 10, when injected from the gates 3 formed in the lower surface central part of the lib part 71, rises in the rib part 71 and successively passes the stepped part 72 and outside air inlet part 73 formed in the circumferential direction of the rib part 71 to fill the cavity 2.

The rib part 71 is formed 80 that the opening diameter is gradually increased with the stepped part 72 having a plurality of steps as the boundary to change the shape of a molded product 150 (refer to FIG. 43) from a thin part to a thick part. When the molten resin 10 flows from the thin part to the thick part, its pressure is released over a wide range due to the presence of the stepped part 72 consisting of a plurality of steps in the rib part 71 of the cavity 2 to weaken the force of pressing the molten resin 10 to the wall surface of the resin molding metal mold 70. Thus, a non-transfer part is apt to be formed in the edge part of the stepped part 72 because the molten resin 10 is not sufficiently intruded thereto. The non-transfer part is apt to start to induce a sink in the cooling process because its adhesive force to the resin molding metal mold 70 is smaller than that of the other part.

Since the outside air inlet part 73 is formed in the broad step 72a of the stepped part 72, the molten resin 10 flowing while closely fitting to the inner surface of the resin molding metal mold 70 by the fountain flow does not get into the edge part having the outside air inlet part 73 formed thereon in the stepped part 71 as described and causes a sink in a wide range in the part acing the stepped part 72 having a plurality of steps by the outside air introduced from the outside air inlet part 73 when it flows on the outside air inlet part 73.

Accordingly, the sink can be selectively generated over a wide range in the resin 10 part facing the outside air inlet part 73, and when the sink is once. generated, this part is relatively higher in temperature than the part making contact with the resin molding metal mold 70 because the cooling from the resin molding metal mold 70 is arrested, and also more easily moved because of the low viscosity of the resin 10 to progress the sink.

This sink is progressed, whereby the part subjected to transfer is less pulled to the thick part by this portion to prevent the sink or contracting deformation of the transfer part.

Accordingly, the stepped part 72 consisting of a plurality of steps and the outside air inlet part 73 are formed on the resin molding metal mold 70 in the position forming a non-transfer part 151 of the molded product 150 as shown in FIG. 43, whereby the non-transfer part 151 can be formed in the part facing the stepped part 72 and outside air inlet part 73 to improve the transfer property of a transfer part 152, so that the shape precision of the molded product 150 can be improved, and transfer of surface state such as wrinkle, transfer of fine surface shape or the like can be easily and precisely performed.

Figure 44:
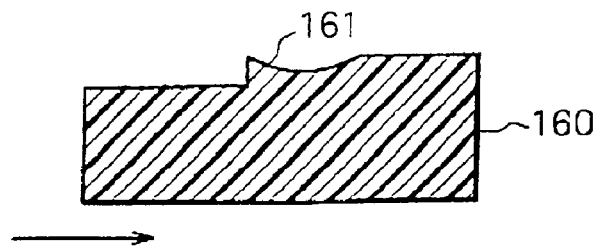
FIG. 44 is an enlarged front view of a non-transfer part in a resin molded product formed by use of a resin molding metal mold having a one-step stepped part.
Figure 45:
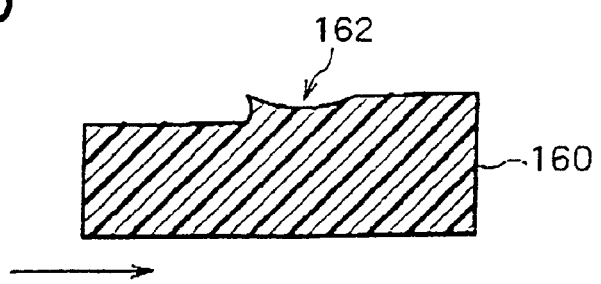
FIG. 45 is an enlarged front view of another example of the non-transfer part in the resin molded product formed by use of the resin molding metal mold having the one-step stepped part.
Figure 46:
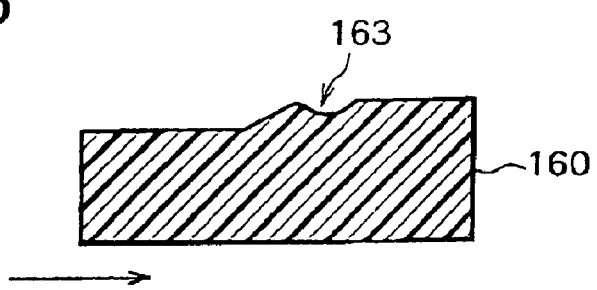
FIG. 46 is an enlarged front view of a non-transfer part in a resin molded product formed by use of a resin molding metal mold having a stepped part having a plurality of tapered steps.
Figure 47:
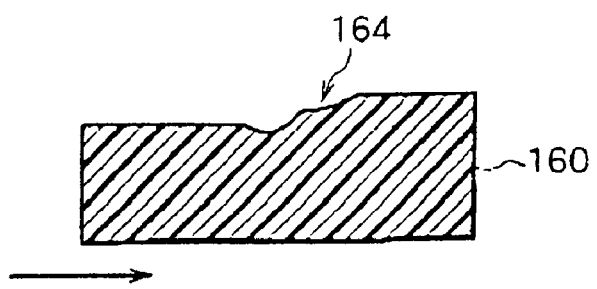
FIG. 47 is an enlarged front view of another example of the non-transfer part in the resin molded product formed by use of the resin molding metal mold having the stepped part having a plurality of tapered steps.

In each of the embodiments described above, non-transfer parts of various shapes 161–164, for example, can be formed on a molded product 160 as shown in FIGS. 44–47 by variously changing the shape of the stepped part. FIG. 44 shows, for example, a non-transfer part 161 of the molded product 160 formed by using a resin molding metal mold having a one-step stepped part changed at a right angle from a minor diameter shape to a major diameter shape in the flowing direction (the arrowed direction in FIG. 44) of the molten resin 10 and a slit, and introducing the outside air thereto by an outside air feeding machine from the slit during and after the injection of the resin. FIG. 45 shows a non-transfer part 162 of the molded product 160 formed by using a resin molding metal mold having a one-stepped part changed at a right angle from a minor diameter shape to a major diameter shape in the flowing direction (the arrowed direction in FIG. 45) of the molten resin 10 and a slit, and introducing the outside air thereto by the outside air feeding machine after the injection of the resin. FIG. 46 shows a non-transfer part 163 of the molded product 160 formed by using a resin molding metal mold having a multi-step stepped part changed in a tapered shape from a minor diameter shape to a major diameter shape in the flowing direction (the arrowed direction in FIG. 46) of the molten resin 10 and a slit, and introducing the outside air thereto by the outside air feeding machine during and after the injection of the resin. FIG. 47 shows a non-transfer part 164 of the molded product 160 armed by using a resin molding metal mold having a multi-step stepped part changed in a tapered shape from a minor diameter shape to a major diameter shape in the flowing direction (the arrowed direction in FIG. 47) of the molten resin 10 and a slit, and introducing the outside air thereto by the outside air feeding machine after the injection of resin.

Figure 48:
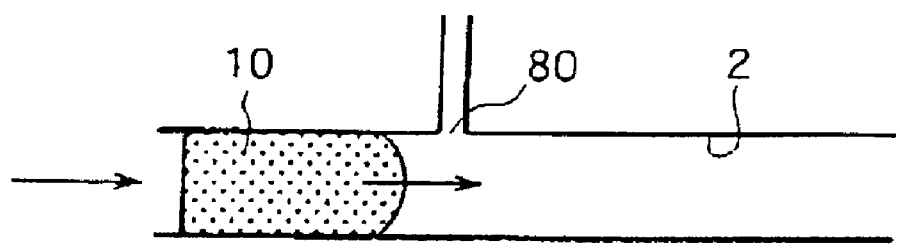
FIG. 48 is an enlarged front sectional view of a slit part of a resin molding metal mold having only a slit without having any stepped part.
Figure 49:
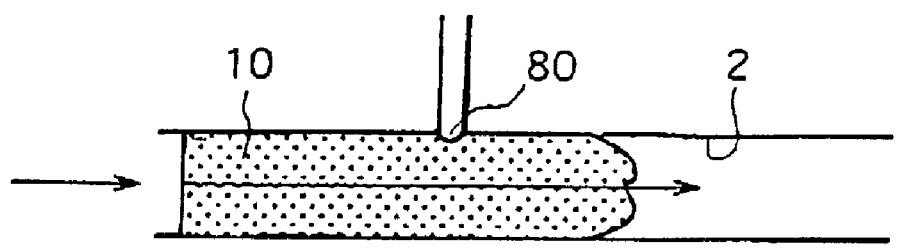
FIG. 49 is an enlarged front sectional view of the slit part of the resin molding metal mold of FIG. 48 in the state where the molten resin flows into the slit part to form a sink.

Although the slit or outside air inlet part is formed in the stopped part in each of the above-mentioned embodiments, only a slit 80 or only an outside air inlet part may be provided as shown in FIGS. 48 and 49 without providing any stepped part, In this case, since the molten resin 10 injected into the cavity 2 is cooled with the outside air introduced from the slit 80 while passing in the slit 80 part as shown in FIGS. 48 and 49, a sink can be selectively generated in the part of the slit 80. When the gas feeding machine connected to the slit 80 or the outside air inlet part is driven during the filling of the molten resin 10 to introduce the gas into the cavity 2, particularly, the resin 10 of the part facing the slit 80 or outside air inlet part can be made hardly fitted to the metal mold surface. Accordingly, the resin of this part is easily separated from the metal mold surface to facilitate the formation of sink in the cooling process. The transfer property of the transfer surface can be improved further more by enlarging the sink of this part more.

Although this invention is specifically described so far on the basis of the preferred embodiments, this invention can be, of course, variously changed without being limited by the above embodiments.

What is claimed is:

1. A resin molding device for molding a resin molded product by injecting a molten resin into a cavity of a metal mold followed by solidification, which device comprises:

a metal mold with a cavity; and an outside air inlet part formed in said metal mold and opened to an optional part of said cavity to allow the outside of said metal mold to communicate with an interior of said cavity, and a stepped part formed at an inner wall of said cavity of said metal mold orthogonally to the flowing direction of said molten resin injected into the cavity, an opening of said outside air inlet part to the cavity being opened at a portion of said stepped portion other than a transfer face of the cavity, said stepped part formed having a plurality of continuous steps.

2. A resin molding device according to claim 1 wherein said outside air inlet part is formed in said stepped part or the boundary of steps of the stepped part.

3. A resin molding device according to claim 1 wherein said outside air inlet part is formed in the state communicating with said cavity in the area between the steps.

4. A resin molding device according to claim 1 further comprising:

a gas feeding means for forcedly feeding a prescribed gas to said outside air inlet part to feed said gas into said cavity through said outside air inlet part by said gas feeding means during and after the injection of said molten resin into said cavity.

5. A resin molding device according to claim 1 further comprising:

a gas feeding means for forcedly feeding a prescribed gas to said outside air inlet part to feed said gas into said cavity through said outside air inlet part by said gas feeding means after the injection of said molten resin into said cavity.

6. A resin molding device according to claim 1, wherein said outside air inlet part is a slit.

7. A resin molding device according to claim 1, wherein s≧t/10, wherein s is a step length of said stepped part and t is a thickness of said molded product.

8. A resin molding device according to claim 1, wherein said outside air inlet part comprises at least one of: a porous member, at least one fine slit, at least one clearance, or a movable member.

9. A resin molding device according to claim 1, wherein said outside air inlet part is formed in a direction where said molten resin crosses over said outside air inlet part during entry of said molten resin into said cavity.

10. A resin molding device according to claim 6, wherein said slit is formed having a width of about 1 to 30 μm in a direction where said molten resin crosses over said slit during entry of said molten resin into said cavity.

11. A resin molding device according to claim 6, wherein said slit is formed in a circumferential direction where said molten resin crosses over said slit during entry of said molten resin into said cavity.

12. A resin molding device according to claim 1, wherein said cavity has an opening diameter increasing at said stepped part as a boundary to change said molded product from a thinner part to a thicker part.

13. A resin molding device according to claim 1, wherein said cavity is changed from a small opening diameter to a large opening diameter in said stepped part as a boundary to change said molded product from a thinner part to a thicker part.

14. A resin molding device according to claim 1, wherein a recessed part is formed in a surface of said cavity of said resin molding metal mold between said outside air inlet part and a transfer face so as to form a protruding projection or rib on said molded product.

15. A resin molding device according to claim 6, wherein a gas feeding machine is connected to said slit to introduce a prescribed gas into said cavity through said slit.

16. A resin molding device according to claim 15, wherein said gas introduced by said gas feeding machine has a pressure of about 1 to 6 kgf/$^2$.

17. A resin molding device according to claim 1, wherein said outside air inlet part is formed in a portion of the metal mold having a unitary structure, such that said outside air inlet part is in constant flow communication with said cavity, without a movement of a moving part of said metal mold.

* * * * *